US012755650B2

(12) United States Patent
Hendrickson et al.

(10) Patent No.: US 12,755,650 B2
(45) Date of Patent: Oct. 6, 2026

(54) SIMULATED BODY TISSUE MODEL

(71) Applicant: SurgiReal Products, Inc., Loveland, CO (US)

(72) Inventors: Grahm J. Hendrickson, Fort Collins, CO (US); Dean A. Hendrickson, Fort Collins, CO (US)

(73) Assignee: SurgiReal Products, Inc., Loveland, CO (US)

( * ) Notice: Subject to any disclaimer, the term of this patent is extended or adjusted under 35 U.S.C. 154(b) by 60 days.

(21) Appl. No.: 18/386,338

(22) Filed: Nov. 2, 2023

(65) Prior Publication Data

US 2024/0153405 A1 May 9, 2024

Related U.S. Application Data

(60) Provisional application No. 63/422,802, filed on Nov. 4, 2022.

(51) Int. Cl.

| | |
|---|---|
| ***G09B 23/30*** | (2006.01) |
| ***B32B 3/28*** | (2006.01) |
| ***B32B 5/02*** | (2006.01) |
| ***B32B 5/26*** | (2006.01) |
| ***B32B 25/10*** | (2006.01) |
| ***B32B 25/20*** | (2006.01) |

(52) U.S. Cl.

CPC ................ *G09B 23/30* (2013.01); *B32B 3/28* (2013.01); *B32B 5/024* (2013.01); *B32B 5/26* (2013.01); *B32B 25/10* (2013.01); *B32B 25/20* (2013.01); *B32B 2260/023* (2013.01); *B32B 2260/046* (2013.01); *B32B 2307/536* (2013.01); *B32B 2535/00* (2013.01)

(58) Field of Classification Search

CPC .............................. G09B 23/285; G09B 23/30

See application file for complete search history.

(56) References Cited

U.S. PATENT DOCUMENTS

| | | | | |
|---|---|---|---|---|
| 5,775,916 | A * | 7/1998 | Cooper .................. | G09B 23/28 434/272 |
| 9,280,917 | B2 * | 3/2016 | Parry, Jr. ................ | G09B 9/003 |
| 2009/0298034 | A1 * | 12/2009 | Parry ..................... | G09B 23/30 434/274 |
| 2012/0015337 | A1 * | 1/2012 | Hendrickson .......... | G09B 23/30 434/267 |
| 2013/0101973 | A1 * | 4/2013 | Hoke ..................... | G09B 23/30 434/267 |
| 2015/0031008 | A1 * | 1/2015 | Black ................... | G09B 23/285 434/272 |
| 2018/0075777 | A1 * | 3/2018 | Iverson .................. | G09B 23/30 |
| 2018/0158373 | A1 * | 6/2018 | Hendrickson .......... | G09B 23/36 |
| 2021/0150937 | A1 * | 5/2021 | White .................... | G09B 23/30 |
| 2023/0386369 | A1 * | 11/2023 | Dickie ................... | G09B 23/34 |

* cited by examiner

*Primary Examiner* — Peter R Egloff

(74) *Attorney, Agent, or Firm* — Craig R. Miles; CR MILES P.C.

(57) ABSTRACT

Disclosed herein are embodiments of a simulated body tissue model, and methods of making and using such a simulated body tissue model, whereby the simulated body tissue model includes a first layer, a second layer underlying the first layer, and a first fabric layer disposed within the second layer, whereby the first fabric layer can be embedded within the second layer.

18 Claims, 14 Drawing Sheets

SIMULATED BODY TISSUE MODEL

I. SUMMARY OF THE INVENTION

A broad object of a particular embodiment of the invention can be to provide a simulated body tissue model, and methods of making and using such a simulated body tissue model, whereby the simulated body tissue model includes a first layer, a second layer underlying the first layer, and a first fabric layer disposed within the second layer, whereby the first fabric layer can be embedded within the second layer.

Naturally, further objects of the invention are disclosed throughout other areas of the specification, drawings, and claims.

II. A BRIEF DESCRIPTION OF THE DRAWINGS

III. DETAILED DESCRIPTION OF THE PREFERRED EMBODIMENTS

Figure 1:
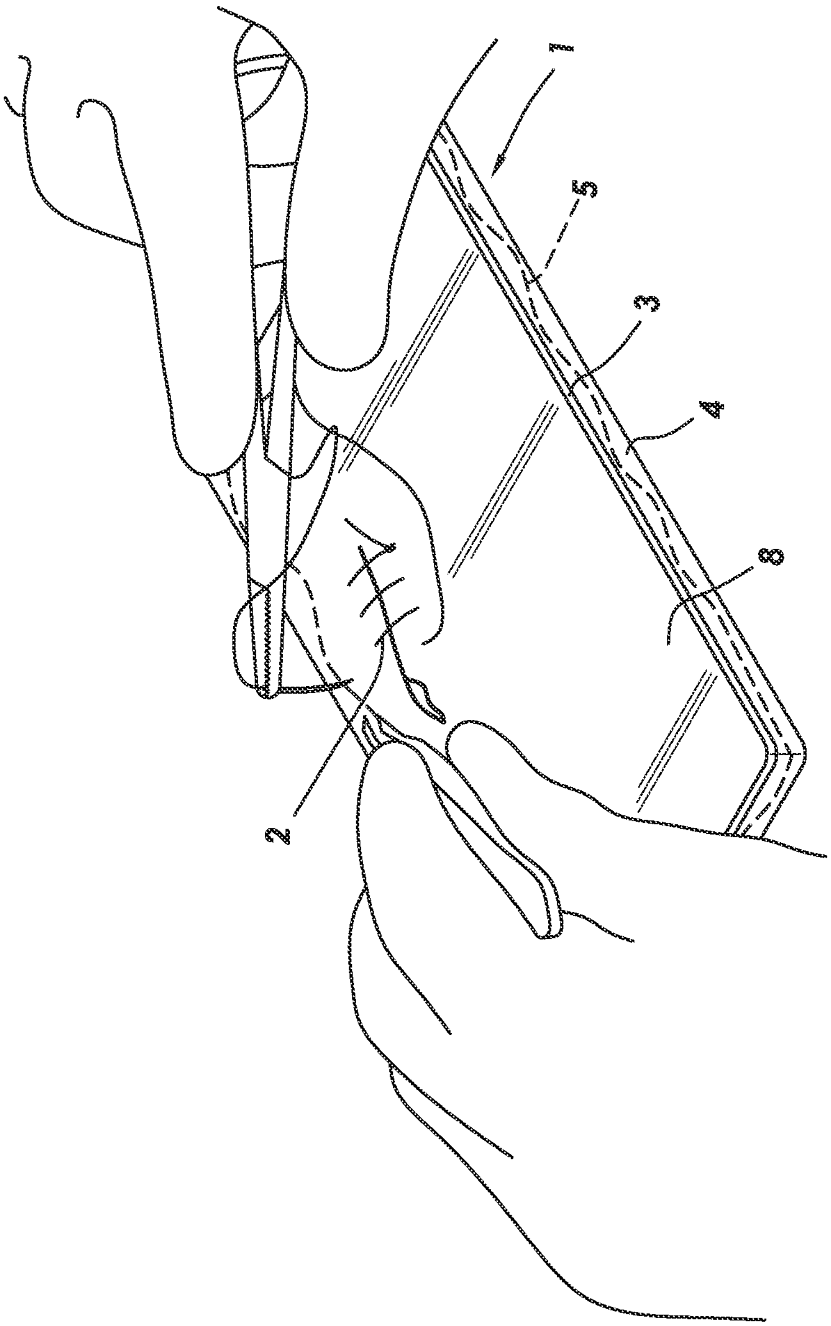
FIG. 1 is an illustration of a method of using a particular embodiment of a simulated body tissue model to practice a closure technique and specifically, suturing.
Figure 2A:
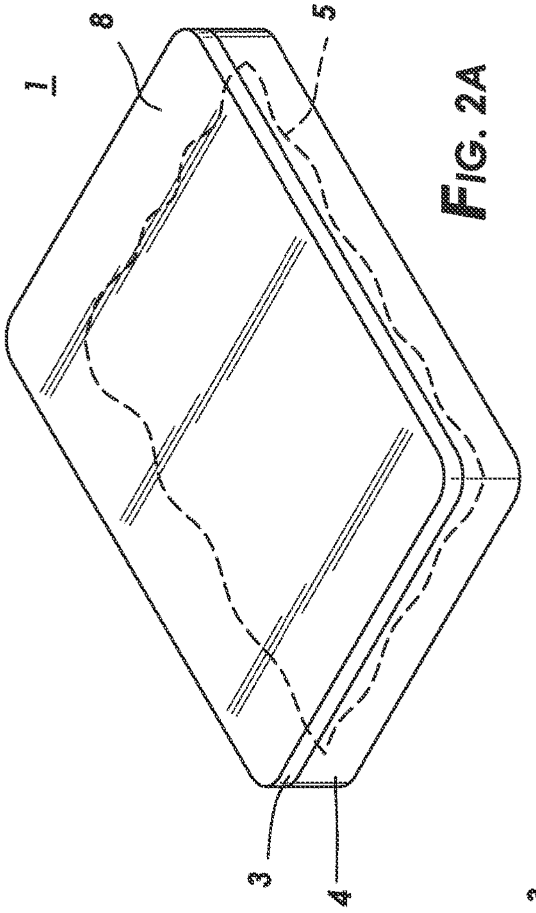
FIG. 2A is a perspective view of a particular embodiment of a simulated body tissue model including first and second layers, whereby a first fabric layer is shown in broken line embedded in the second layer.
Figure 2C:
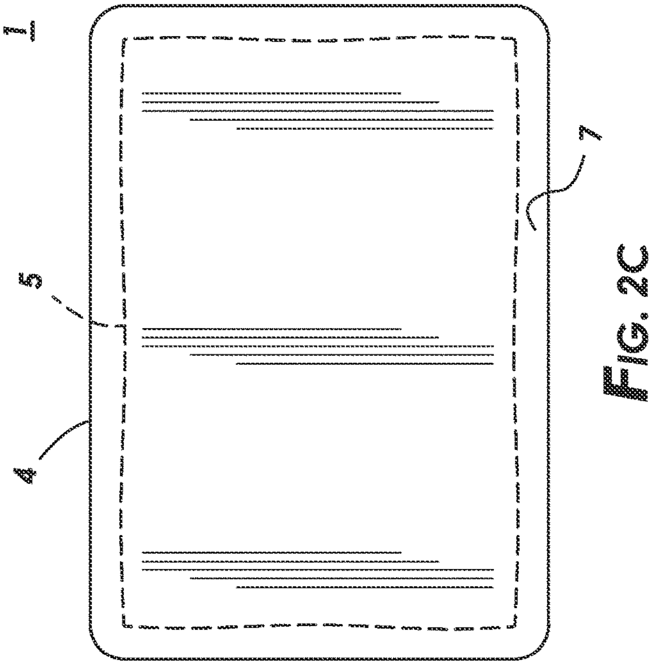
FIG. 2C is a bottom view of the particular embodiment of the simulated body tissue model shown in FIG. 2A.
Figure 2B:
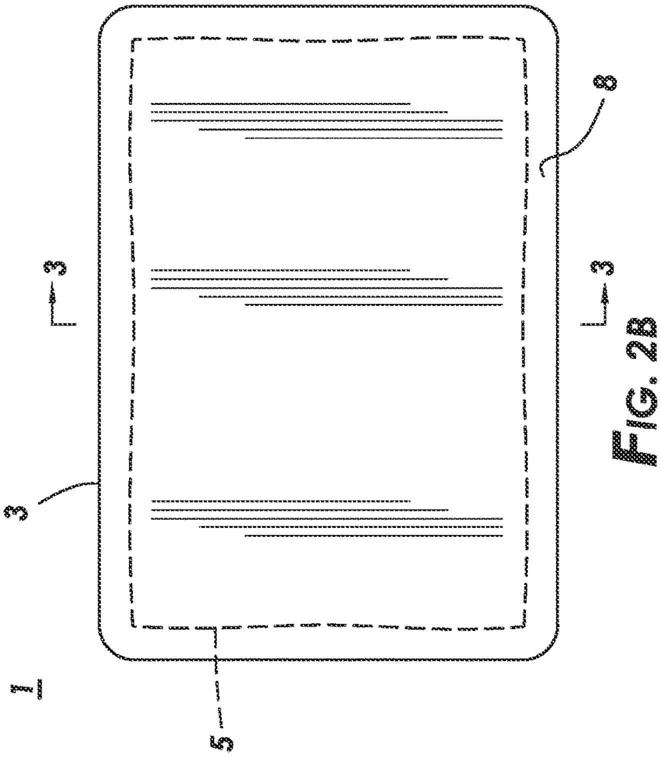
FIG. 2B is a top view of the particular embodiment of the simulated body tissue model shown in FIG. 2A.
Figure 2D:
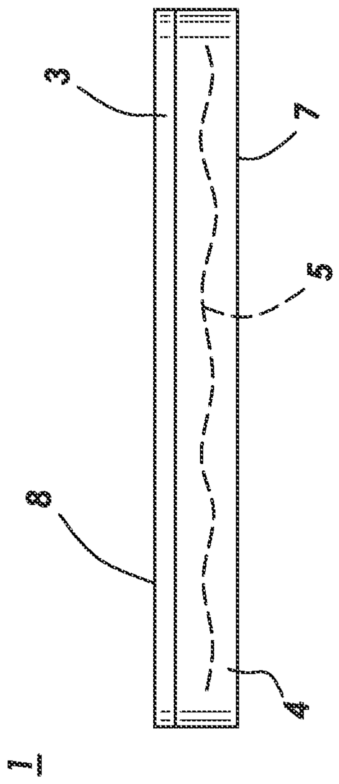
FIG. 2D is a first side view of the particular embodiment of the simulated body tissue model shown in FIG. 2A.
Figure 2E:
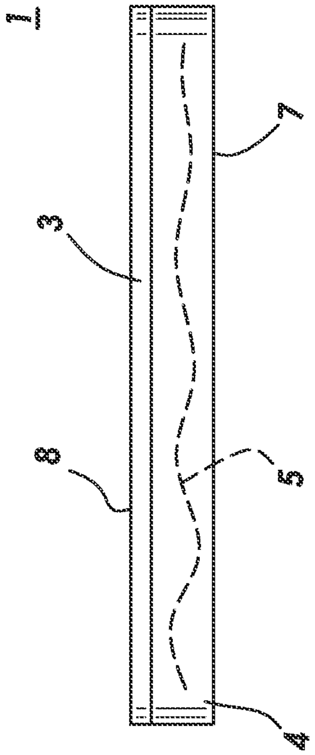
FIG. 2E is a second side view of the particular embodiment of the simulated body tissue model shown in FIG. 2A.
Figure 2F:
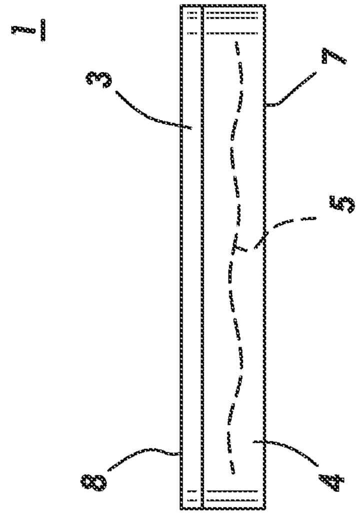
FIG. 2F is a first end view of the particular embodiment of the simulated body tissue model shown in FIG. 2A.
Figure 2G:
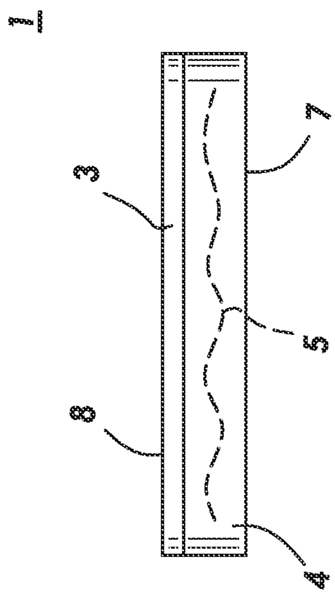
FIG. 2G is a second end view of the particular embodiment of the simulated body tissue model shown in FIG. 2A.
Figure 3:
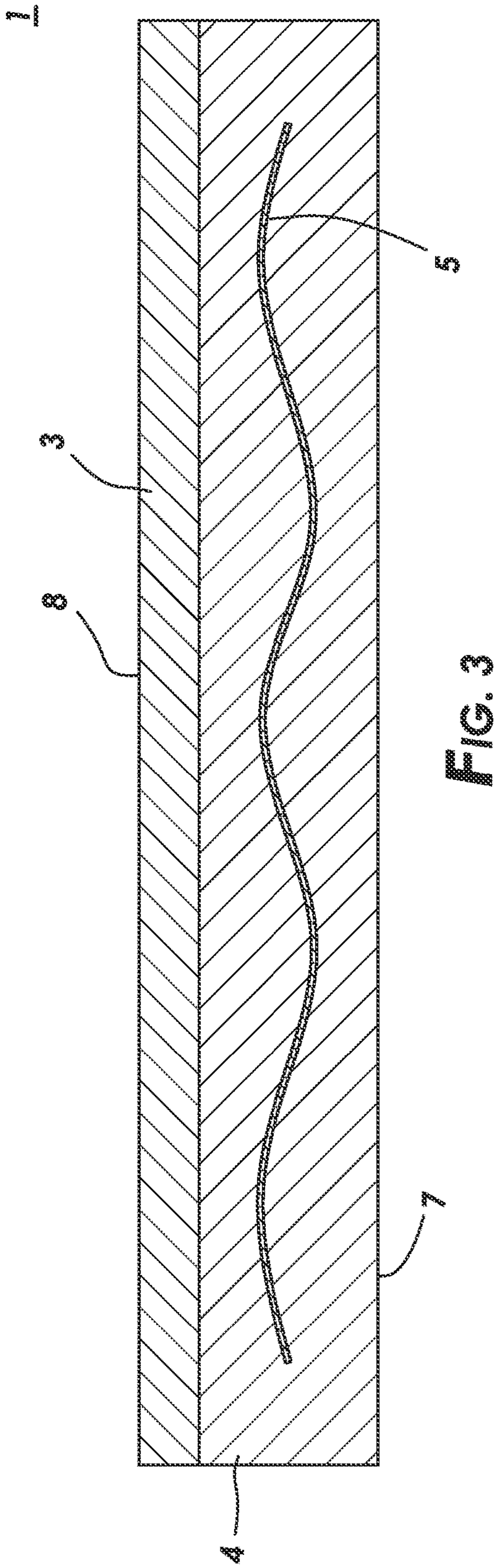
FIG. 3 is a cross sectional view of the particular embodiment of the simulated body tissue model shown in FIG. 2B.
Figure 4:
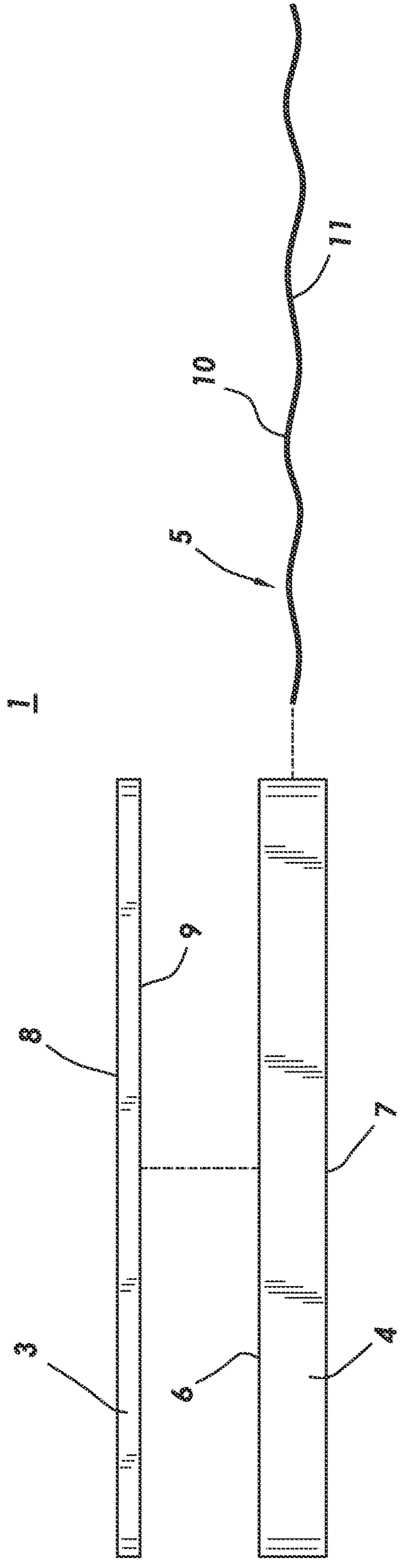
FIG. 4 is an exploded view of the particular embodiment of the simulated body tissue model shown in FIGS. 2A through 2G.
Figure 5A:
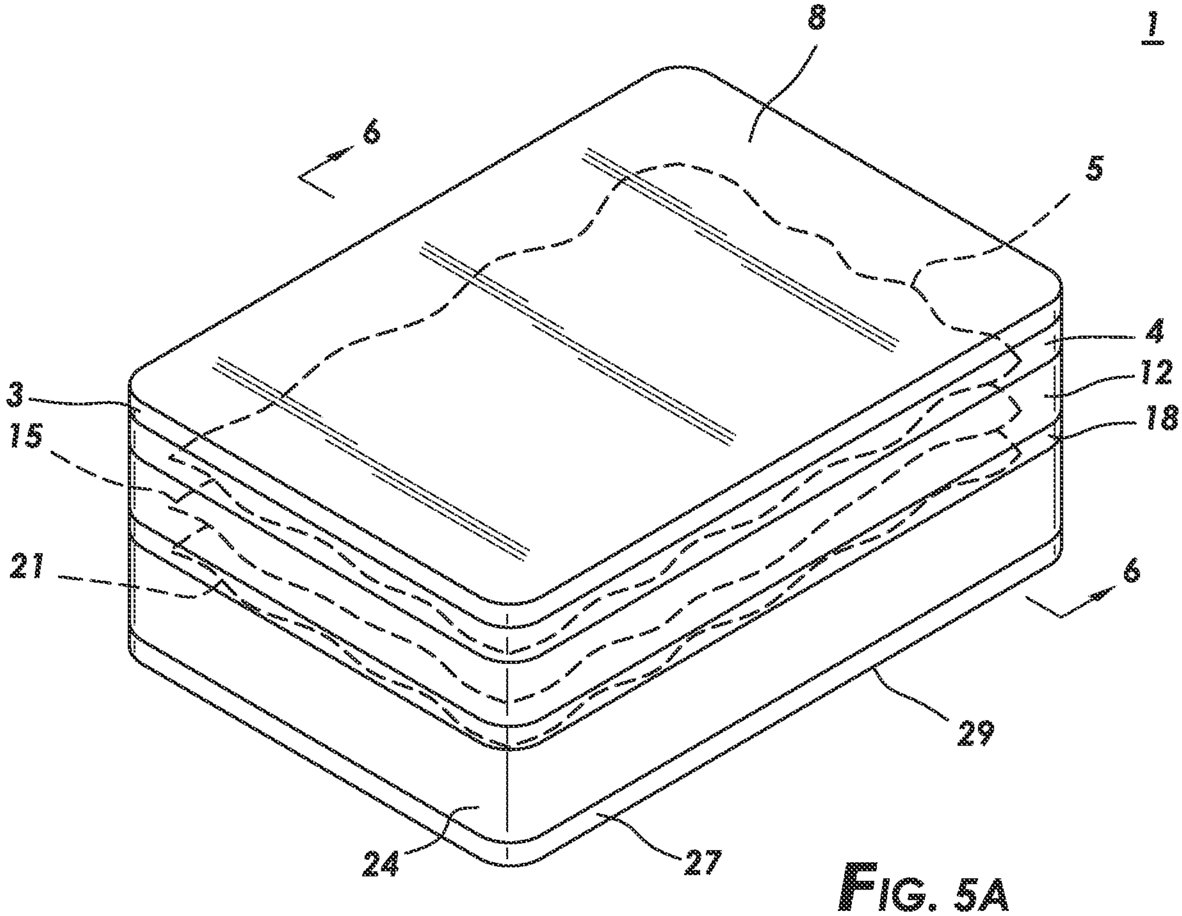
FIG. 5A is a perspective view of a particular embodiment of a simulated body tissue model including first, second, third, fourth, fifth, and sixth layers, whereby first, second, and third fabric layers are shown in broken line embedded in the second, third, and fourth layers, respectively.
Figure 5B:
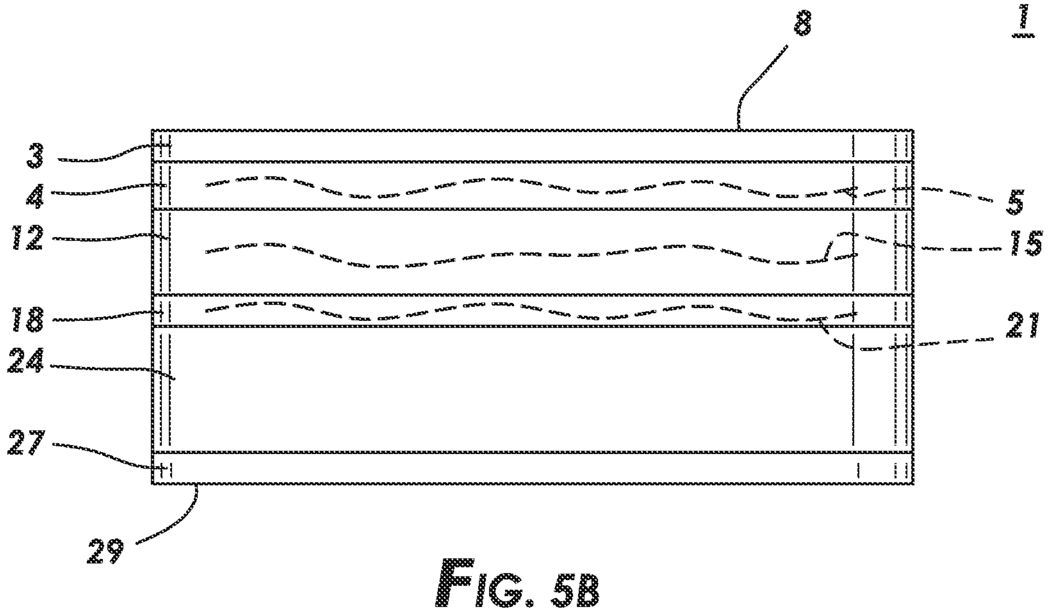
FIG. 5B is a first end view of the particular embodiment of the simulated body tissue model shown in FIG. 5A.
Figure 6:
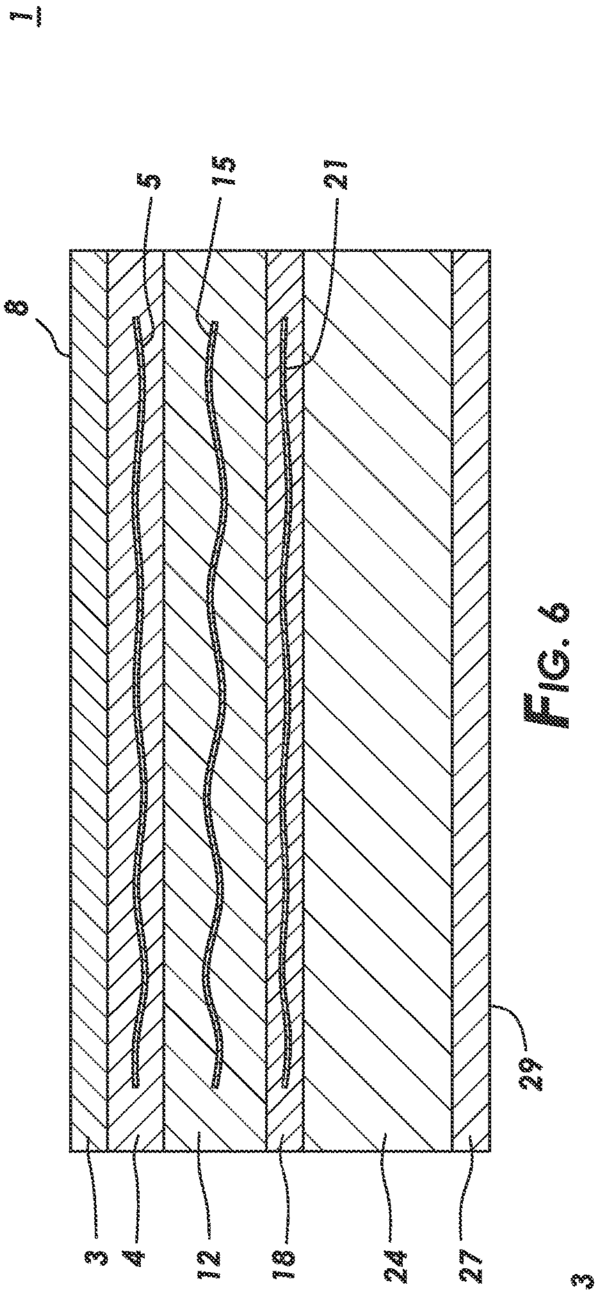
FIG. 6 is a cross sectional view of the particular embodiment of the simulated body tissue model shown in FIG. 5A.
Figure 7:
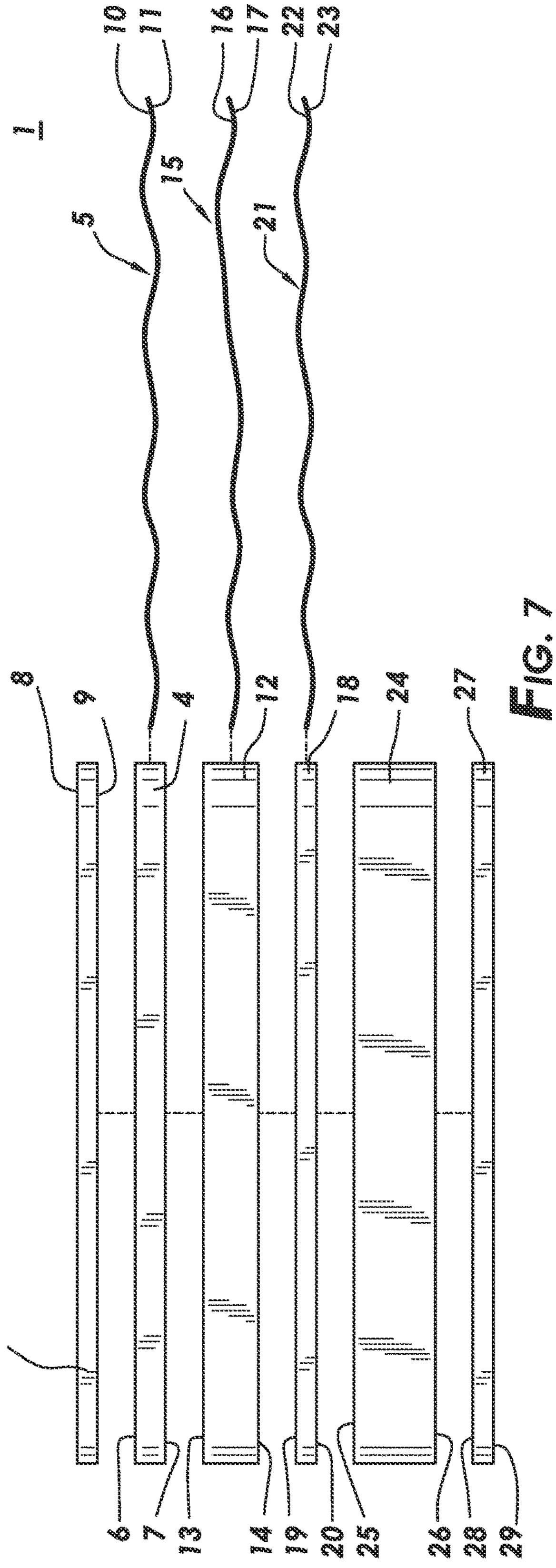
FIG. 7 is an exploded view of the particular embodiment of the simulated body tissue model shown in FIGS. 5A and 5B.
Figure 8A:
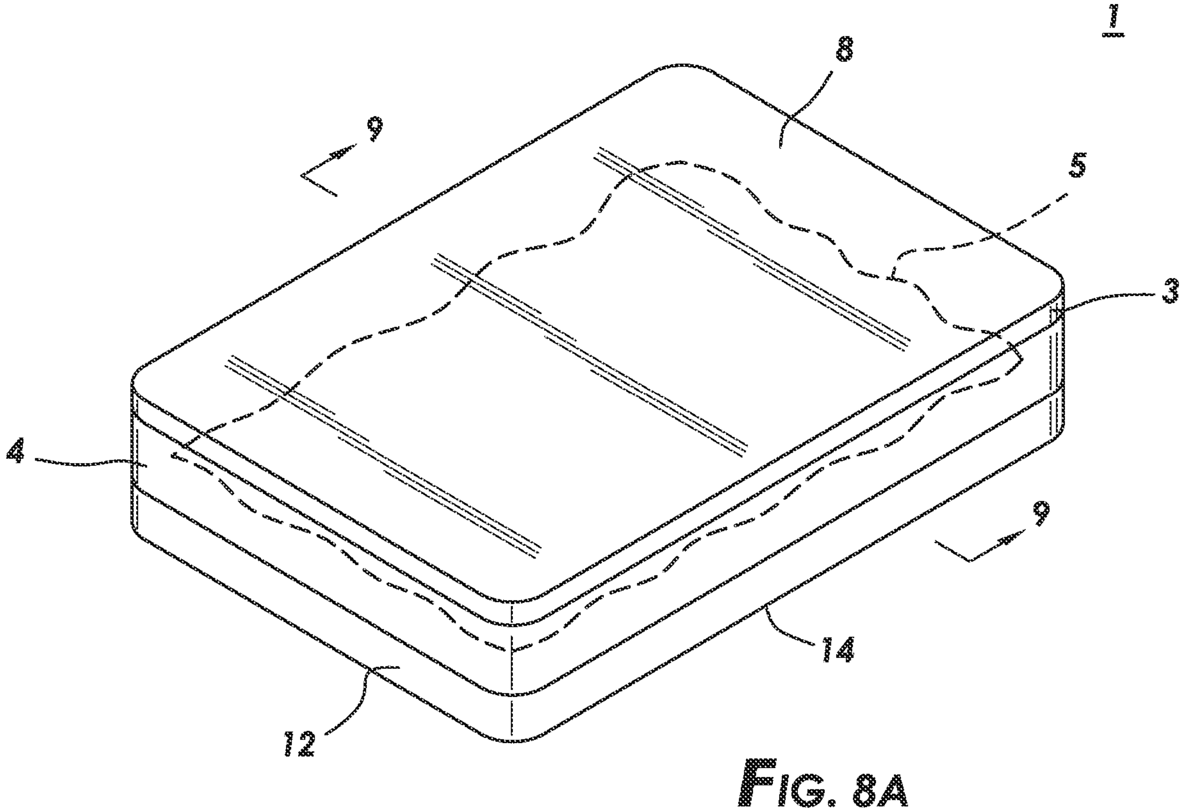
FIG. 8A is a perspective view of a particular embodiment of a simulated body tissue model including first, second, and third layers, whereby a first fabric layer is shown in broken line embedded in the second layer.
Figure 8B:
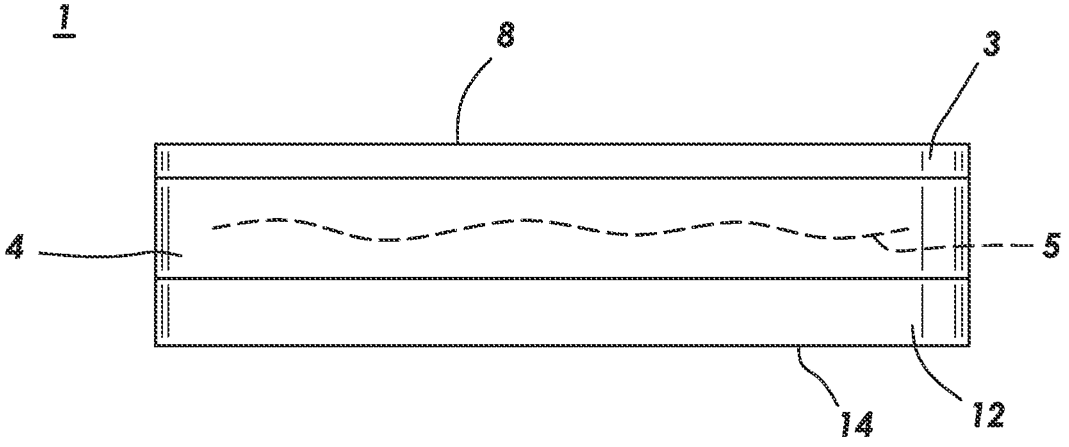
FIG. 8B is a first end view of the particular embodiment of the simulated body tissue model shown in FIG. 8A.
Figure 9:
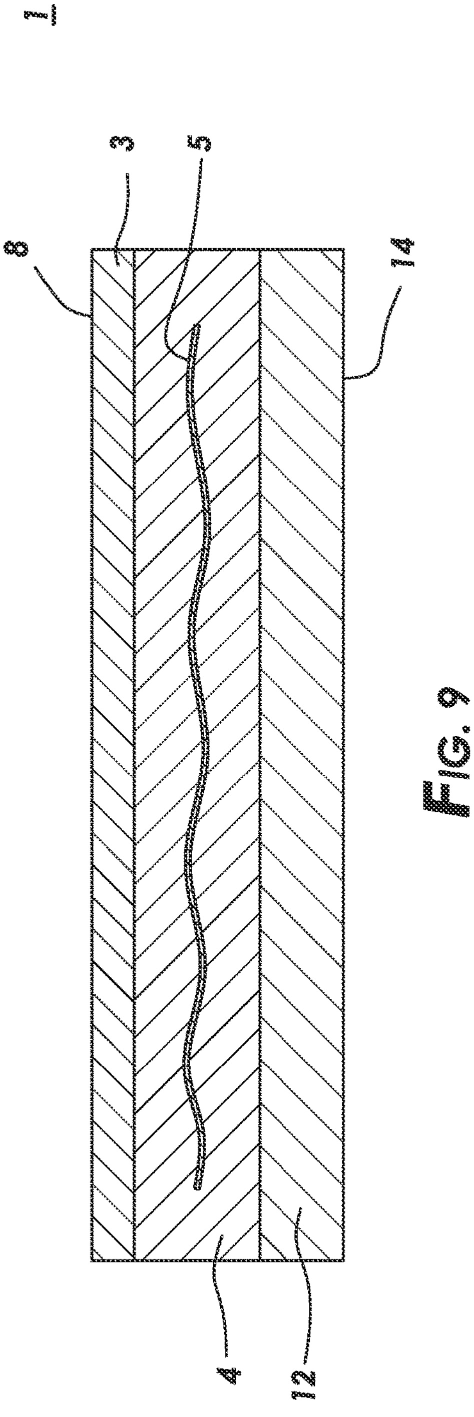
FIG. 9 is a cross sectional view of the particular embodiment of the simulated body tissue model shown in FIG. 8A.
Figure 10:
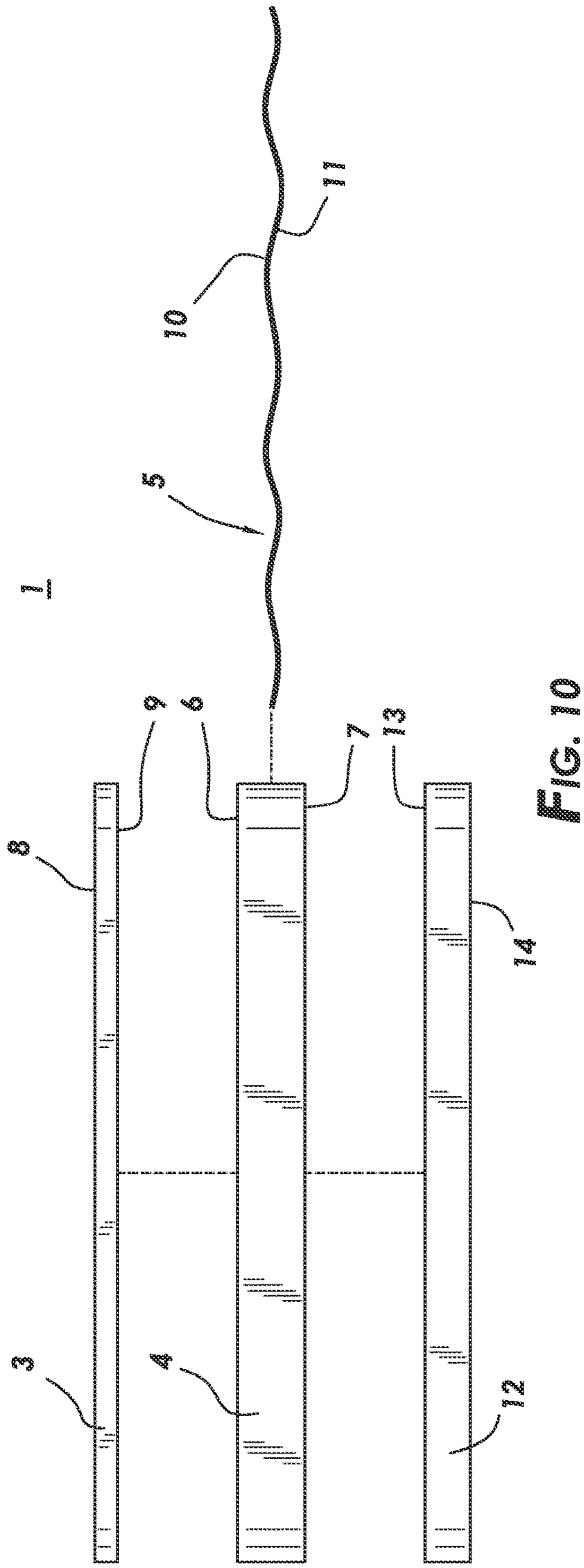
FIG. 10 is an exploded view of the particular embodiment of the simulated body tissue model shown in FIGS. 8A and 8B.

Now referring primarily to FIG. 1, which illustrates a method of using a particular embodiment of a simulated body tissue model (1) to practice a clinical procedure(s) (for example a closure technique, such as suturing with sutures (2)), whereby the simulated body tissue model (1) includes a first layer (3), a second layer (4) underlying the first layer (3), and a first fabric layer (5) disposed within the second layer (4), whereby the first fabric layer (5) can be embedded within the second layer (4) and specifically, the first fabric layer (5) can be embedded between opposing second layer upper and lower surfaces (6)(7).

As used herein, the term "simulate" and derivatives thereof refer to imitating or mimicking something else, or made in imitation of something else.

As used herein, the term "fabric" and derivatives thereof mean a cloth or other material made by (i) interlacing fibers, such as by weaving fibers (woven fabric) or knitting fibers (knitted fabric), or (ii) bonding/splicing/tangling/felting fibers together (non-woven fabric).

As used herein, the term "embed" and derivatives thereof mean to incorporate or fix into a surrounding mass and/or to make something an integral part of a surrounding whole.

First Layer

Now referring primarily to FIGS. 1 through 4, the instant simulated body tissue model (1) includes a first layer (3) which disposes above or over a second layer (4), whereby the first layer (3) can be bounded by opposing first layer upper and lower surfaces (8)(9) (which can be planar or substantially planar). Dimensionally, the first layer (3) can have any length, width, and thickness suitable for functioning as part of the instant simulated body tissue model (1) on which a clinical procedure(s) can be practiced. As but one illustrative example, the first layer (3) can be about 8 centimeters wide by about 11 centimeters long. As but a second illustrative example, the first layer (3) can be about 17.5 centimeters wide by about 24.5 centimeters long. Concerning thickness, as but one illustrative example, the first layer (3) can be in a range of about 0.5 to about 1.5 millimeters thick. Generally, the thickness of the first layer (3) can be dependent upon the tissue which the first layer (3) is intended to simulate; additionally, the thickness of the first layer (3) can be relatively appropriate in comparison to the other simulated layer(s) in the body tissue model (1).

Second Layer

Again referring primarily to FIGS. 1 through 4, the instant simulated body tissue model (1) further includes a second layer (4) which disposes below or under the first layer (3), whereby the second layer (4) can be bounded by opposing second layer upper and lower surfaces (6)(7) (which can be planar or substantially planar). Correspondingly, the second layer upper surface (6) can be (i) coupled to or (ii) adjacent to the first layer lower surface (9). As to particular embodiments, the second layer upper surface (6) can be (i) directly coupled to, (ii) directly adjacent to, or (iii) engaged with the first layer lower surface (9) such that there are no additional layers between the second layer upper surface (6) and the first layer lower surface (9).

As to particular embodiments, the first and second layers (3)(4) can be fixedly coupled, connected, or attached to one another.

Dimensionally, the second layer (4) can have any length, width, and thickness suitable for functioning as part of the instant simulated body tissue model (1) on which a clinical procedure(s) can be practiced. As but one illustrative example and akin to the first layer (3), the second layer (4) can be about 8 centimeters wide by about 11 centimeters long. As but a second illustrative example and akin to the first layer (3), the second layer (4) can be about 17.5 centimeters wide by about 24.5 centimeters long. Concerning thickness, as but one illustrative example, the second layer (4) can be in a range of about 1 to about 3.5 millimeters thick. Generally, the thickness of the second layer (4) can be dependent upon the tissue which the second layer (4) is intended to simulate; additionally, the thickness of the second layer (4) can be relatively appropriate in comparison to the other simulated layer(s) in the body tissue model (1).

First Fabric Layer

Again referring primarily to FIGS. 1 through 4, the instant simulated body tissue model (1) further includes a first fabric layer (5) disposed within the second layer (4). In particular, the first fabric layer (5) can be embedded within the second layer (4). As to particular embodiments, the first fabric layer (5) can be embedded between opposing second layer upper and lower surfaces (6)(7) or said another way, embedded below the second layer upper surface (6) and above the second layer lower surface (7), such that the first fabric layer (5) is not present on either of the second layer upper or lower surfaces (6)(7). In this way, the first fabric layer (5) may be suspended within the second layer (4) between the second layer upper and lower surfaces (6)(7).

Regarding dimensions, the first fabric layer (5) can have any length and width suitable for embedding within the second layer (4). Additionally, the first fabric layer (5) can be comparatively thin, particularly relative to the second layer (4). As but one illustrative example, the first fabric layer (5) can have a thickness of less than about 50% of the thickness of the second layer (4). As another illustrative example, the first fabric layer (5) can have a thickness of less than about 40% of the thickness of the second layer (4). As another illustrative example, the first fabric layer (5) can have a thickness of less than about 30% of the thickness of the second layer (4). As another illustrative example, the first fabric layer (5) can have a thickness of less than about 20% of the thickness of the second layer (4). As another illustrative example, the first fabric layer (5) can have a thickness of less than about 15% of the thickness of the second layer (4). As another illustrative example, the first fabric layer (5) can have a thickness of less than about 10% of the thickness of the second layer (4). As another illustrative example, the first fabric layer (5) can have a thickness of less than about 5% of the thickness of the second layer (4).

The first fabric layer (5) embedded within the second layer (4) can function to provide structural support, strength, rigidity, and/or elasticity to the second layer (4); correspondingly, the first fabric layer (5) can be configured to mimic connective tissue which characteristically includes a mesh-like network of collagen fibers and/or elastin fibers, thus enhancing the realism of the instant second layer (4) in addition to facilitating repeated use of the simulated body tissue model (1).

As indicated above, upon disposition of the first fabric layer (5) within the second layer (4), the first fabric layer (5) can be embedded between opposing second layer upper and lower surfaces (6)(7). Significantly, in contrast to the planar or substantially planar second layer upper and lower surfaces (6)(7), the embedded first fabric layer (5) and its corresponding opposing first fabric layer upper and lower surfaces (10)(11) can be nonplanar or not solely lying in a single plane or having a three-dimensional quality, which may be akin to the disposition of collagen and/or elastin fibers within connective tissue. As to particular embodiments, the embedded first fabric layer (5) can be undulating or wavy. Of note, the nonplanar and/or undulating and/or wavy disposition of the embedded first fabric layer (5) can be attributed to the method of disposing the first fabric layer (5) within the second layer (4), as detailed below.

Concerning exemplary material, the first fabric layer (5) can be made from (i) interlacing fibers, such as woven fibers (woven fabric) or knitted fibers (knitted fabric), or (ii) bonded/spliced/tangled/felted fibers (non-woven fabric), whereby the fibers can be plant-based fibers (such as cotton, linen, hemp, jute, bamboo, nettle, sisal, or the like); animal-based fibers (such as wool, silk, fur, feathers, or the like); mineral-based fibers (such as glass, aluminum, asbestos, or the like); or synthetic fibers (such as rayon, acetate, acrylic, spandex, polyester, nylon, or the like).

As to particular embodiments, the first fabric layer (5) can comprise chiffon, which is made by alternately weaving together S-twist and Z-twist yarns which results in a slightly puckered fabric that facilitates greater elasticity and produces a more textured appearance. This weaving method also gives chiffon a relatively rough feel and a sheer appearance. In addition, chiffon can be relatively thin, lightweight, and "flowy," thereby making chiffon a suitable fabric for the instant first fabric layer (5).

As to particular embodiments, the first fabric layer (5) can consist of only one piece of fabric, as opposed to multiple pieces of fabric layered on top of one another.

First Exemplary Embodiment

Now referring primarily to FIGS. 5A through 7, a first particular embodiment of the simulated body tissue model (1) can include a first layer (3), as described above, which can simulate real body tissue in both appearance and physical characteristics. In particular, the first layer (3) can be configured to mimic skin.

As to particular embodiments, the first layer (3) can be configured to mimic the epidermis; thus, the first layer (3) can have a texture, thickness (such as about 1 millimeter), durometer, color (such as a light or dark skin tone), and surface details that closely simulate a real epidermis.

Typically in animals (including humans), the epidermis, comprised of stratified squamous epithelial cells, is the outermost layer of the skin which acts as a barrier that protects the body from the environment. The epidermis overlays the dermis, which comprises connective tissue.

Regarding exemplary material, to mimic the epidermis, the first layer (3) can be formed from silicone rubber, such as platinum-catalyzed silicone, which may have a Shore hardness of about 00-45 to about 00-55 when cured. As but one non-limiting example, the first layer (3) can be formed from BLUESIL™ RTV 3611 QC A&B and, as to particular embodiments BLUESIL™ SP FX DEADENER 10, both of which may be obtained from Elkem Silicones, East Brunswick, New Jersey, United States.

Again referring primarily to FIGS. 5A through 7, the first particular embodiment of the simulated body tissue model (1) can further include a second layer (4), as described above, which can simulate real body tissue in both appearance and physical characteristics. In particular, the second layer (4) can be configured to mimic the dermis; thus, the second layer (4) can have a texture, thickness (such as about 1.5 millimeters), durometer, and color (such as yellowish white) that closely simulate a real dermis.

Typically in animals (including humans), the dermis, which lies beneath the epidermis and above the subcutaneous tissue, is a thick layer of fibrous and elastic tissue (made mostly of collagen, with a small component of elastin) that gives the skin its flexibility and strength. The dermis contains nerve endings, sweat glands and oil glands (sebaceous glands), hair follicles, and blood vessels.

Regarding exemplary material, to mimic the dermis, the second layer (4) can be formed from silicone rubber, such as platinum-catalyzed silicone, which may have a greater Shore hardness than the first layer (3) and accordingly, may be relatively harder than the first layer (3). For example, the second layer (4) may have a Shore hardness of about A 0 to about A 5 when cured. As but one non-limiting example, the second layer (4) can be formed from BLUESIL™ RTV 3611 QC A&B and, as to particular embodiments BLUESIL™ SP FX DEADENER 10, both of which may be obtained from Elkem Silicones, East Brunswick, New Jersey, United States.

Again referring primarily to FIGS. 5A through 7, the first particular embodiment of the simulated body tissue model (1) can further include a first fabric layer (5), as described above, embedded within the second layer (4) and functioning to provide structural support, strength, rigidity, and/or elasticity to the second layer (4); correspondingly, the first fabric layer (5) can be configured to mimic connective tissue, such as the mesh-like network of collagen fibers and/or elastin fibers found in the dermis (and particularly in the reticular dermis), thus enhancing the realism of the instant simulated dermal layer in addition to facilitating repeated use of the simulated body tissue model (1).

As to particular embodiments, the first fabric layer (5) can be elastic. As to particular embodiments, the first fabric layer (5) can have one-way elasticity. As to particular embodiments, the first fabric layer (5) can have two-way elasticity.

As to particular embodiments, the first fabric layer (5) can comprise an elastic chiffon. As to particular embodiments, chiffon made from nylon may be a suitable fabric for the instant first fabric layer (5).

Again referring primarily to FIGS. 5A through 7, the first particular embodiment of the simulated body tissue model (1) can, but need not necessarily, further include a third layer (12) with opposing third layer upper and lower surfaces (13)(14) (which can be planar or substantially planar), whereby the third layer (12) can dispose below or under the second layer (4). Correspondingly, the third layer upper surface (13) can be (i) coupled to or (ii) adjacent to the second layer lower surface (7). As to particular embodiments, the third layer upper surface (13) can be (i) directly coupled to, (ii) directly adjacent to, or (iii) engaged with the second layer lower surface (7) such that there are no additional layers between the third layer upper surface (13) and the second layer lower surface (7).

As to particular embodiments, the second and third layers (4)(12) can be fixedly coupled, connected, or attached to one another.

Dimensionally, the third layer (12) can have any length, width, and thickness suitable for functioning as part of the instant simulated body tissue model (1) on which a clinical procedure(s) can be practiced. As but one illustrative example and akin to the second layer (4), the third layer (12) can be about 8 centimeters wide by about 11 centimeters long. As but a second illustrative example and akin to the second layer (4), the third layer (12) can be about 17.5 centimeters wide by about 24.5 centimeters long. Concerning thickness, as but one illustrative example, the third layer (12) can be in a range of about 2.25 to about 3.25 millimeters thick. Generally, the thickness of the third layer (12) can be dependent upon the tissue which the third layer (12) is intended to simulate; additionally, the thickness of the third layer (12) can be relatively appropriate in comparison to the other simulated layer(s) in the body tissue model (1).

As for simulation, the third layer (12) can mimic real body tissue in both appearance and physical characteristics.

As to particular embodiments, the third layer (12) can be configured to mimic subcutaneous tissue, primarily comprising adipose tissue and a lesser amount of connective tissue; thus, the third layer (12) can have a texture, thickness (such as about 2.75 millimeters), durometer, and color (such as yellow and/or peach) that closely simulate real subcutaneous tissue, which may be perceived as having greasy, soft, and compliant tactile characteristics or the tactile characteristics of harder, denser fat tissue. Additionally, the third layer (12) can have a lesser resistance to strain in comparison to the first and second layers (3)(4).

Regarding exemplary material, to mimic subcutaneous tissue, the third layer (12) can be formed from silicone rubber, such as platinum-catalyzed silicone, which may have a lesser Shore hardness than the first and second layers (3)(4) and accordingly, may be relatively softer than the first and second layers (3)(4). For example, the third layer (12) may have a Shore hardness of about 00-15 to about 00-25 when cured. As but one non-limiting example, the third layer (12) can be formed from BLUESIL™ RTV 3611 QC A&B and, as to particular embodiments BLUESIL™ SP FX DEADENER 10, both of which may be obtained from Elkem Silicones, East Brunswick, New Jersey, United States.

Again referring primarily to FIGS. 5A through 7, the first particular embodiment of the simulated body tissue model (1) can, but need not necessarily, further include a second fabric layer (15) disposed within the third layer (12). In particular, the second fabric layer (15) can be embedded within the third layer (12). As to particular embodiments, the second fabric layer (15) can be embedded between opposing third layer upper and lower surfaces (13)(14) or said another way, embedded below the third layer upper surface (13) and above the third layer lower surface (14), such that the second fabric layer (15) is not present on either of the third layer upper or lower surfaces (13)(14). In this way, the second fabric layer (15) may be suspended within the third layer (12) between the third layer upper and lower surfaces (13)(14).

Regarding dimensions, the second fabric layer (15) can have any length and width suitable for embedding within the third layer (12). Additionally, the second fabric layer (15) can be comparatively thin, particularly relative to the third layer (12). As but one illustrative example, the second fabric layer (15) can have a thickness of less than about 50% of the thickness of the third layer (12). As another illustrative example, the second fabric layer (15) can have a thickness of less than about 40% of the thickness of the third layer (12). As another illustrative example, the second fabric layer (15) can have a thickness of less than about 30% of the thickness of the third layer (12). As another illustrative example, the second fabric layer (15) can have a thickness of less than about 20% of the thickness of the third layer (12). As another illustrative example, the second fabric layer (15) can have a thickness of less than about 15% of the thickness of the third layer (12). As another illustrative example, the second fabric layer (15) can have a thickness of less than about 10% of the thickness of the third layer (12). As another illustrative example, the second fabric layer (15) can have a thickness of less than about 5% of the thickness of the third layer (12).

The second fabric layer (15) embedded within the third layer (121) can function to provide structural support, strength, rigidity, and/or elasticity to the third layer (12); correspondingly, the second fabric layer (15) can be configured to mimic connective tissue, such as the mesh-like network of collagen fibers and/or elastin fibers found in the subcutaneous tissue, thus enhancing the realism of the instant simulated subcutaneous tissue layer in addition to facilitating repeated use of the simulated body tissue model (1).

As indicated above, upon disposition of the second fabric layer (15) within the third layer (12), the second fabric layer (15) can be embedded between opposing third layer upper and lower surfaces (13)(14). Significantly, in contrast to the planar or substantially planar third layer upper and lower surfaces (13)(14), the embedded second fabric layer (15) and its corresponding opposing second fabric layer upper and lower surfaces (16)(17) can be nonplanar or not solely lying in a single plane or having a three-dimensional quality, which may be akin to the disposition of collagen and/or elastin fibers within the subcutaneous tissue. As to particular embodiments, the embedded second fabric layer (15) can be undulating or wavy. Of note, the nonplanar and/or undulating and/or wavy disposition of the embedded second fabric layer (15) can be attributed to the method of disposing the second fabric layer (15) within the third layer (12), as detailed below.

Concerning exemplary material, the second fabric layer (15) can be made from fibers, as described above for the first fabric layer (5).

As to particular embodiments, the second fabric layer (15) can comprise chiffon, as described above for the first fabric layer (5).

As to particular embodiments, the second fabric layer (15) can be elastic. As to particular embodiments, the second fabric layer (15) can have one-way elasticity. As to particular embodiments, the second fabric layer (15) can have two-way elasticity.

As to particular embodiments, the second fabric layer (15) can comprise an elastic chiffon. As to particular embodiments, chiffon made from nylon may a suitable fabric for the instant second fabric layer (15).

The second fabric layer (15) can be the same as, similar to, or different from the first fabric layer (5), depending upon the embodiment of the simulated body tissue model (1).

Again referring primarily to FIGS. 5A through 7, the first particular embodiment of the simulated body tissue model (1) can, but need not necessarily, further include a fourth layer (18) with opposing fourth layer upper and lower surfaces (19)(20) (which can be planar or substantially planar), whereby the fourth layer (18) can dispose below or under the third layer (12). Correspondingly, the fourth layer upper surface (19) can be (i) coupled to or (ii) adjacent to the third layer lower surface (14). As to particular embodiments, the fourth layer upper surface (19) can be (i) directly coupled to, (ii) directly adjacent to, or (iii) engaged with the third layer lower surface (14) such that there are no additional layers between the fourth layer upper surface (19) and the third layer lower surface (14).

As to particular embodiments, the third and fourth layers (12)(18) can be fixedly coupled, connected, or attached to one another.

Dimensionally, the fourth layer (18) can have any length, width, and thickness suitable for functioning as part of the instant simulated body tissue model (1) on which a clinical procedure(s) can be practiced. As but one illustrative example and akin to the third layer (12), the fourth layer (18) can be about 8 centimeters wide by about 11 centimeters long. As but a second illustrative example and akin to the third layer (12), the fourth layer (18) can be about 17.5 centimeters wide by about 24.5 centimeters long. Concerning thickness, as but one illustrative example, the fourth layer (18) can be in a range of about 0.5 to about 2.5 millimeters thick. Generally, the thickness of the fourth layer (18) can be dependent upon the tissue which the fourth layer (18) is intended to simulate; additionally, the thickness of the fourth layer (18) can be relatively appropriate in comparison to the other simulated layer(s) in the body tissue model (1).

As for simulation, the fourth layer (18) can mimic real body tissue in both appearance and physical characteristics.

As to particular embodiments, the fourth layer (18) can be configured to mimic a first layer of fascia; thus, the fourth layer (18) can have a texture, thickness (such as about 1 millimeter to about 2 millimeters), durometer, and color (such as white) that closely simulate real fascia which comprises a band or sheet of connective tissue fibers beneath the skin that attach, stabilize, enclose, and separate muscles and other internal organs.

Regarding exemplary material, to mimic fascia, the fourth layer (18) can be formed from silicone rubber, such as platinum-catalyzed silicone, which may have a Shore hardness of about A 0 to about A 5 when cured. As but one non-limiting example, the fourth layer (18) can be formed from BLUESIL™ RTV 3611 QC A&B and, as to particular embodiments BLUESIL™ SP FX DEADENER 10, both of which may be obtained from Elkem Silicones, East Brunswick, New Jersey, United States.

Again referring primarily to FIGS. 5A through 7, the first particular embodiment of the simulated body tissue model (1) can, but need not necessarily, further include a third fabric layer (21) disposed within the fourth layer (18). In particular, the third fabric layer (21) can be embedded within the fourth layer (18). As to particular embodiments, the third fabric layer (21) can be embedded between opposing fourth layer upper and lower surfaces (19)(20) or said another way, embedded below the fourth layer upper surface (19) and above the fourth layer lower surface (20), such that the third fabric layer (21) is not present on either of the fourth layer upper or lower surfaces (19)(20). In this way, the third fabric layer (21) may be suspended within the fourth layer (18) between the fourth layer upper and lower surfaces (19)(20).

Regarding dimensions, the third fabric layer (21) can have any length and width suitable for embedding within the fourth layer (18). Additionally, the third fabric layer (21) can be comparatively thin, particularly relative to the fourth layer (18). As but one illustrative example, the third fabric layer (21) can have a thickness of less than about 50% of the thickness of the fourth layer (18). As another illustrative example, the third fabric layer (21) can have a thickness of less than about 40% of the thickness of the fourth layer (18). As another illustrative example, the third fabric layer (21) can have a thickness of less than about 30% of the thickness of the fourth layer (18). As another illustrative example, the third fabric layer (21) can have a thickness of less than about 20% of the thickness of the fourth layer (18). As another illustrative example, the third fabric layer (21) can have a thickness of less than about 15% of the thickness of the fourth layer (18). As another illustrative example, the third fabric layer (21) can have a thickness of less than about 10% of the thickness of the fourth layer (18). As another illustrative example, the third fabric layer (21) can have a thickness of less than about 5% of the thickness of the fourth layer (18).

The third fabric layer (21) embedded within the fourth layer (18) can function to provide structural support, strength, rigidity, and/or elasticity to the fourth layer (182); correspondingly, the third fabric layer (21) can be configured to mimic connective tissue, such as the mesh-like network of collagen fibers and/or elastin fibers found in fascia, thus enhancing the realism of the instant simulated fascia layer in addition to facilitating repeated use of the simulated body tissue model (1).

As indicated above, upon disposition of the third fabric layer (21) within the fourth layer (18), the third fabric layer (21) can be embedded between opposing fourth layer upper and lower surfaces (19)(20). Significantly, in contrast to the planar or substantially planar fourth layer upper and lower surfaces (19)(20), the embedded third fabric layer (21) and its corresponding opposing third fabric layer upper and lower surfaces (22)(23) can be nonplanar or not solely lying in a single plane or having a three-dimensional quality, which may be akin to the disposition of collagen and/or elastin fibers within the fascia. As to particular embodiments, the embedded third fabric layer (21) can be undulating or wavy. Of note, the nonplanar and/or undulating and/or wavy disposition of the embedded third fabric layer (21) can be attributed to the method of disposing the third fabric layer (21) within the fourth layer (18), as detailed below.

Concerning exemplary material, the third fabric layer (21) can be made from fibers, as described above for the first fabric layer (5).

As to particular embodiments, the third fabric layer (21) can comprise chiffon, as described above for the first fabric layer (5).

As to particular embodiments, the third fabric layer (21) can be nonelastic.

As to particular embodiments, the third fabric layer (21) can comprise a nonelastic chiffon. As to particular embodiments, chiffon made from polyester may a suitable fabric for the instant third fabric layer (21).

As to particular embodiments, the third fabric layer (21) can be different from the first and second fabric layers (5)(15); for example, the third fabric layer (21) can be nonelastic whereas the first and second fabric layers (5)(15) can be elastic.

Again referring primarily to FIGS. 5A through 7, the first particular embodiment of the simulated body tissue model (1) can, but need not necessarily, further include a fifth layer (24) with opposing fifth layer upper and lower surfaces (25)(26) (which can be planar or substantially planar), whereby the fifth layer (24) can dispose below or under the fourth layer (18). Correspondingly, the fifth layer upper surface (25) can be (i) coupled to or (ii) adjacent to the fourth layer lower surface (20). As to particular embodiments, the fifth layer upper surface (25) can be (i) directly coupled to, (ii) directly adjacent to, or (iii) engaged with the fourth layer lower surface (20) such that there are no additional layers between the fifth layer upper surface (25) and the fourth layer lower surface (20).

As to particular embodiments, the fourth and fifth layers (18)(24) can be fixedly coupled, connected, or attached to one another.

Dimensionally, the fifth layer (24) can have any length, width, and thickness suitable for functioning as part of the instant simulated body tissue model (1) on which a clinical procedure(s) can be practiced. As but one illustrative example and akin to the fourth layer (18), the fifth layer (24) can be about 8 centimeters wide by about 11 centimeters long. As but a second illustrative example and akin to the fourth layer (18), the fifth layer (24) can be about 17.5 centimeters wide by about 24.5 centimeters long. Concerning thickness, as but one illustrative example, the fifth layer (24) can be in a range of about 3.5 to about 4.5 millimeters thick. Generally, the thickness of the fifth layer (24) can be dependent upon the tissue which the fifth layer (24) is intended to simulate; additionally, the thickness of the fifth layer (24) can be relatively appropriate in comparison to the other simulated layer(s) in the body tissue model (1).

As for simulation, the fifth layer (24) can mimic real body tissue in both appearance and physical characteristics.

As to particular embodiments, the fifth layer (24) can be configured to mimic muscle; thus, the fifth layer (24) can have a texture, thickness (such as about 4 millimeters), durometer, and color (such as red) that closely simulate real muscle.

Regarding exemplary material, to mimic muscle, the fifth layer (24) can be formed from silicone rubber, such as platinum-catalyzed silicone, which may have a Shore hardness of about 00-05 to about 00-15 when cured. As but one non-limiting example, the fifth layer (24) can be formed from BLUESIL™ RTV 3611 QC A&B and, as to particular embodiments BLUESIL™ SP FX DEADENER 10, both of which may be obtained from Elkem Silicones, East Brunswick, New Jersey, United States.

Again referring primarily to FIGS. 5A through 7, the first particular embodiment of the simulated body tissue model (1) can, but need not necessarily, further include a sixth layer (27) with opposing sixth layer upper and lower surfaces (28)(29) (which can be planar or substantially planar), whereby the sixth layer (27) can dispose below or under the fifth layer (24). Correspondingly, the sixth layer upper surface (28) can be (i) coupled to or (ii) adjacent to the fifth layer lower surface (26). As to particular embodiments, the sixth layer upper surface (28) can be (i) directly coupled to, (ii) directly adjacent to, or (iii) engaged with the fifth layer lower surface (26) such that there are no additional layers between the sixth layer upper surface (28) and the fifth layer lower surface (26).

As to particular embodiments, the fifth and sixth layers (24)(27) can be fixedly coupled, connected, or attached to one another.

Dimensionally, the sixth layer (27) can have any length, width, and thickness suitable for functioning as part of the instant simulated body tissue model (1) on which a clinical procedure(s) can be practiced. As but one illustrative example and akin to the fifth layer (24), the sixth layer (27) can be about 8 centimeters wide by about 11 centimeters long. As but a second illustrative example and akin to the fifth layer (24), the sixth layer (27) can be about 17.5 centimeters wide by about 24.5 centimeters long. Concerning thickness, as but one illustrative example, the sixth layer (27) can be in a range of about 0.5 to about 2.5 millimeters thick. Generally, the thickness of the sixth layer (27) can be dependent upon the tissue which the sixth layer (27) is intended to simulate; additionally, the thickness of the sixth layer (27) can be relatively appropriate in comparison to the other simulated layer(s) in the body tissue model (1).

As for simulation, the sixth layer (27) can mimic real body tissue in both appearance and physical characteristics.

As to particular embodiments, the sixth layer (27) can be configured to mimic a second layer of fascia; thus, the sixth layer (27) can have a texture, thickness (such as about 1 millimeter to about 2 millimeters), durometer, and color (such as white) that closely simulate real fascia which comprises a band or sheet of connective tissue fibers beneath the skin that attach, stabilize, enclose, and separate muscles and other internal organs.

Regarding exemplary material, to mimic fascia, the sixth layer (27) can be formed from silicone rubber, such as platinum-catalyzed silicone, which may have a Shore hardness of about A 0 to about A 5 when cured. As but one non-limiting example, the sixth layer (27) can be formed from BLUESIL™ RTV 3611 QC A&B and, as to particular embodiments BLUESIL™ SP FX DEADENER 10, both of which may be obtained from Elkem Silicones, East Brunswick, New Jersey, United States.

In the first particular embodiment of the simulated body tissue model (1) described above, each of the second, third, and fourth layers (4)(12)(18) simulating the dermis, subcutaneous tissue, and first layer of fascia, respectively, include a fabric layer (5)(15)(21). However, as to other particular embodiments, layers simulating these particular tissues need not necessarily include a fabric layer. Additionally, layers simulating other tissues, such as the epidermis and muscle, may include a fabric layer.

Second Exemplary Embodiment

Now referring primarily to FIGS. 8A through 10, a second particular embodiment of the simulated body tissue model (1) can include a first layer (3), as described above, which can simulate real body tissue in both appearance and physical characteristics. In particular, the first layer (3) can be configured to mimic skin.

As to particular embodiments, the first layer (3) can be configured to mimic the epidermis; thus, the first layer (3) can have a texture, thickness (such as about 1 millimeter), durometer, color (such as a light or dark skin tone), and surface details that closely simulate a real epidermis.

Typically in animals (including humans), the epidermis, comprised of stratified squamous epithelial cells, is the outermost layer of the skin which acts as a barrier that protects the body from the environment. The epidermis overlays the dermis, which comprises connective tissue.

Regarding exemplary material, to mimic the epidermis, the first layer (3) can be formed from silicone rubber, such as platinum-catalyzed silicone, which may have a Shore hardness of about 00-45 to about 00-55 when cured. As but one non-limiting example, the first layer (3) can be formed from BLUESIL™ RTV 3611 QC A&B and, as to particular embodiments BLUESIL™ SP FX DEADENER 10, both of which may be obtained from Elkem Silicones, East Brunswick, New Jersey, United States.

Again referring primarily to FIGS. 8A through 10, the second particular embodiment of the simulated body tissue model (1) can further include a second layer (4), as described above, which can simulate real body tissue in both appearance and physical characteristics. In particular, the second layer (4) can be configured to mimic subcutaneous tissue, primarily comprising adipose tissue and a lesser amount of connective tissue; thus, the second layer (4) can have a texture, thickness (such as about 2.75 millimeters), durometer, and color (such as yellow and/or peach) that closely simulate real subcutaneous tissue, which may be perceived as having greasy, soft, and compliant tactile characteristics or the tactile characteristics of harder, denser fat tissue. Additionally, the second layer (4) can have a lesser resistance to strain in comparison to the first layer (3).

Regarding exemplary material, to mimic subcutaneous tissue, the second layer (4) can be formed from silicone rubber, such as platinum-catalyzed silicone, which may have a lesser Shore hardness than the first layer (3) and accordingly, may be relatively softer than the first layer (3). For example, the second layer (4) may have a Shore hardness of about 00-15 to about 00-25 when cured. As but one non-limiting example, the second layer (4) can be formed from BLUESIL™ RTV 3611 QC A&B and, as to particular embodiments BLUESIL™ SP FX DEADENER 10, both of which may be obtained from Elkem Silicones, East Brunswick, New Jersey, United States.

Again referring primarily to FIGS. 8A through 10, the second particular embodiment of the simulated body tissue model (1) can further include a first fabric layer (5), as described above, embedded within the second layer (4) and functioning to provide structural support, strength, rigidity, and/or elasticity to the second layer (4); correspondingly, the first fabric layer (5) can be configured to mimic connective tissue, such as the mesh-like network of collagen fibers and/or elastin fibers found in the subcutaneous tissue, thus enhancing the realism of the instant simulated subcutaneous tissue layer in addition to facilitating repeated use of the simulated body tissue model (1).

As to particular embodiments, the first fabric layer (5) can be elastic. As to particular embodiments, the first fabric layer (5) can have one-way elasticity. As to particular embodiments, the first fabric layer (5) can have two-way elasticity.

As to particular embodiments, the first fabric layer (5) can comprise an elastic chiffon. As to particular embodiments, chiffon made from nylon may be a suitable fabric for the instant first fabric layer (5).

Again referring primarily to FIGS. 8A through 10, the second particular embodiment of the simulated body tissue model (1) can, but need not necessarily, further include a third layer (12) with opposing third layer upper and lower surfaces (13)(14) (which can be planar or substantially planar), whereby the third layer (12) can dispose below or under the second layer (4). Correspondingly, the third layer upper surface (13) can be (i) coupled to or (ii) adjacent to the second layer lower surface (7). As to particular embodiments, the third layer upper surface (13) can be (i) directly coupled to, (ii) directly adjacent to, or (iii) engaged with the second layer lower surface (7) such that there are no additional layers between the third layer upper surface (13) and the second layer lower surface (7).

As to particular embodiments, the second and third layers (4)(12) can be fixedly coupled, connected, or attached to one another.

Dimensionally, the third layer (12) can have any length, width, and thickness suitable for functioning as part of the instant simulated body tissue model (1) on which a clinical procedure(s) can be practiced. As but one illustrative example and akin to the second layer (4), the third layer (12) can be about 8 centimeters wide by about 11 centimeters long. As but a second illustrative example and akin to the second layer (4), the third layer (12) can be about 17.5 centimeters wide by about 24.5 centimeters long. Concerning thickness, as but one illustrative example, the third layer (12) can be in a range of about 0.5 to about 2.5 millimeters thick. Generally, the thickness of the third layer (12) can be dependent upon the tissue which the third layer (12) is intended to simulate; additionally, the thickness of the third layer (12) can be relatively appropriate in comparison to the other simulated layer(s) in the body tissue model (1).

As for simulation, the third layer (12) can mimic real body tissue in both appearance and physical characteristics.

As to particular embodiments, the third layer (12) can be configured to mimic fascia; thus, the third layer (12) can have a texture, thickness (such as about 1 millimeter to about 2 millimeters), durometer, and color (such as white) that closely simulate real fascia which comprises a band or sheet of connective tissue fibers beneath the skin that attach, stabilize, enclose, and separate muscles and other internal organs.

Regarding exemplary material, to mimic fascia, the third layer (12) can be formed from silicone rubber, such as platinum-catalyzed silicone, which may have a Shore hardness of about A 0 to about A 5 when cured. As but one non-limiting example, the third layer (12) can be formed from BLUESIL™ RTV 3611 QC A&B and, as to particular embodiments BLUESIL™ SP FX DEADENER 10, both of which may be obtained from Elkem Silicones, East Brunswick, New Jersey, United States.

In the second particular embodiment of the simulated body tissue model (1) described above, the second layer (4) simulating subcutaneous tissue includes a fabric layer (5). However, as to other particular embodiments, a layer simulating subcutaneous tissue need not necessarily include a fabric layer. Additionally, layers simulating other tissues, such as the epidermis and fascia, may include a fabric layer.

Flexible Layer

As to particular embodiments, one or more of the silicone rubber layers (3)(4)(12)(18)(24)(27) described above can be flexible, meaning capable of being relatively easily flexed or bent. Consequently, a flexible layer can be conformable to a nonplanar surface, or can have an amount of flex which allows the flexible layer to conform to a nonplanar surface. Upon conforming to the nonplanar surface, the flexible layer can dispose in parallel or substantially parallel relation to the nonplanar surface.

Conduit

As to particular embodiments, the instant simulated body tissue model (1) can further include a conduit beneath one or more of the simulated body tissue layers (3)(4)(12)(18)(24)(27), whereby the conduit can be configured to contain or pass therethrough at least one flowable simulated physiological fluid which can egress from a conduit lumen upon disruption of a conduit wall defining the conduit lumen. Correspondingly, this embodiment of the simulated body tissue model (1) may be useful for practicing a clinical procedure involving puncture by a needle and subsequent injection of fluid into the conduit lumen, withdrawal of simulated physiological fluid from the conduit lumen, cannulation (for example intravenous cannulation), or the like.

As to particular embodiments, the conduit can be coupled to a reservoir containing flowable simulated physiological fluid.

As to particular embodiments, the conduit can be configured as simulated vasculature, such as one or more simulated blood vessels which may contain simulated blood. The simulated blood vessel(s) may be useful for practicing a venipuncture procedure, such as intravenous injection, withdrawal of simulated blood, cannulation, or the like.

Wound Simulant

As to particular embodiments, the instant simulated body tissue model (1) can further include a wound simulant coupled to, contained within, or integrated with one of more of the simulated body tissue layers (3)(4)(12)(18)(24)(27), whereby the wound simulant can be configured as an open wound or laceration requiring closure. Accordingly, this embodiment of the simulated body tissue model (1) may be useful for practicing a clinical procedure involving open wound or laceration closure techniques, such as suturing, stapling, application of adhesive tape(s), application of tissue adhesive(s), or the like.

Simulated Pathology

As to particular embodiments, the instant simulated body tissue model (1) can further include a simulated pathology, thereby including (i) simulated body tissue which defines a closed cavity having a closed cavity interior space, and (ii) a flowable simulated pathological fluid disposed within the closed cavity interior space, as detailed in United States Patent Application Publication Number 2017/0116888 titled "Body Tissue Model Including a Simulated Pathology," which is hereby incorporated by reference herein in its entirety.

Wearable Simulant

As to particular embodiments, the instant simulated body tissue model (1) can be a wearable simulant, thereby including (i) a flexible simulated body tissue layer, (ii) a flexible penetration-resistant layer coupled to the simulated body tissue layer, and (iii) an attachment system coupled to the simulated body tissue layer, the attachment system configured to attach the wearable simulant to a wearer to provide a worn simulant, as detailed in United States Patent Application Publication Number 2018/0158373 titled "Wearable Simulant," which is hereby incorporated by reference herein in its entirety.

Method of Making

A method of making a particular embodiment of the instant simulated body tissue model (1) includes generating a first layer (3), disposing a second layer (4) beneath the first layer (3), and disposing a first fabric layer (5) within the second layer (4). As to particular embodiments, the method can further include embedding the first fabric layer (5) within the second layer (4). As to particular embodiments, the method can further include embedding the first fabric layer (5) between opposing second layer upper and lower surfaces (6)(7).

Figure 11:
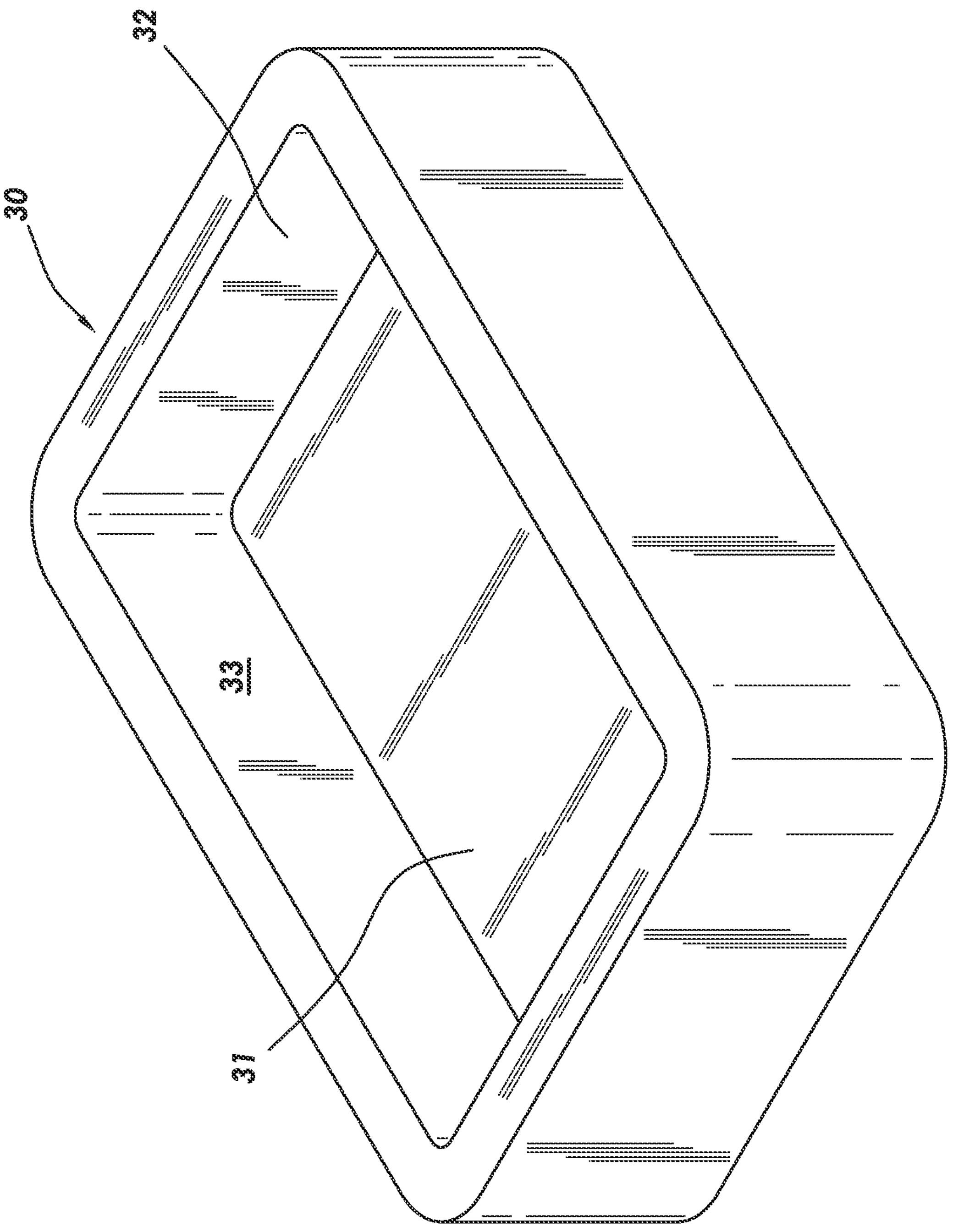
FIG. 11 is a perspective view of a mold which may be useful for making a particular embodiment of a simulated body tissue model.

Now referring primarily to FIG. 11, the method can further include using a mold (30) to generate the first layer (3) of the simulated body tissue model (1), whereby the mold (30) includes a mold interior lower surface (31) configured to mimic a negative of a surface of a body tissue which the first layer (3) is intended to simulate, such as the epidermis.

The mold interior lower surface (31) can be surrounded by mold walls (32) which upwardly extend from the mold interior lower surface (31). The mold walls (32), together with the mold interior lower surface (31), define a mold interior space (33).

Figure 12A:
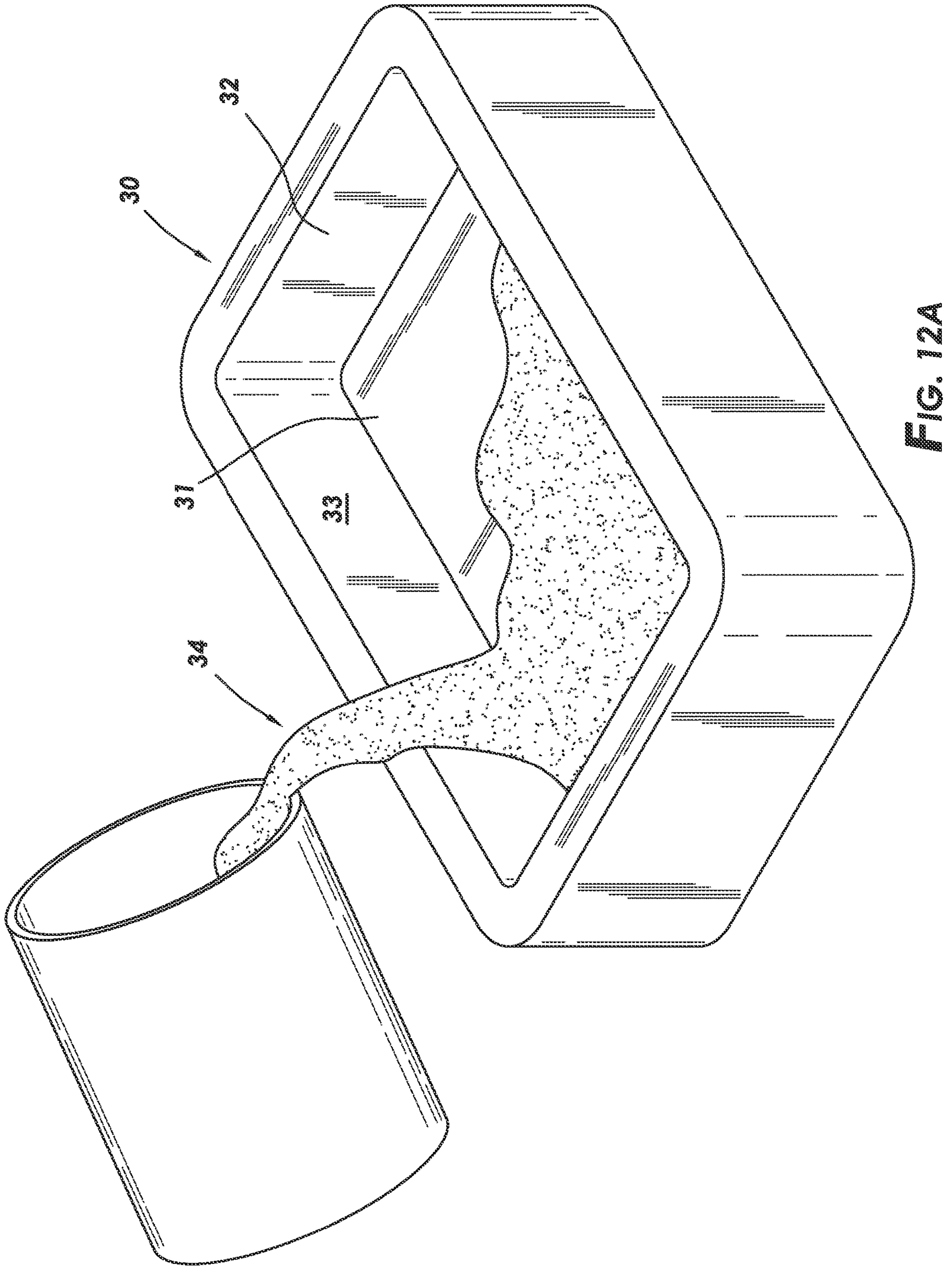
FIG. 12A is an illustration of a method of using the mold shown in FIG. 11 to make the simulated body tissue model, whereby a flowable first layer is being deposited into a mold interior space.

Now referring primarily to FIG. 12A, the method can further include overlaying the mold interior lower surface (31) with a flowable first layer (34), for example by depositing the flowable first layer (34) into the mold interior space (33).

As to particular embodiments, the mold (30) can be positioned such that the mold interior lower surface (31)

disposes in a substantially horizontal position for deposition of the flowable first layer (34) into the mold interior space (33), whereby as an illustrative example, the deposition can be achieved by pouring.

Subsequently, the flowable first layer (34) can cure to provide a cured first layer (35).

Figure 12B:
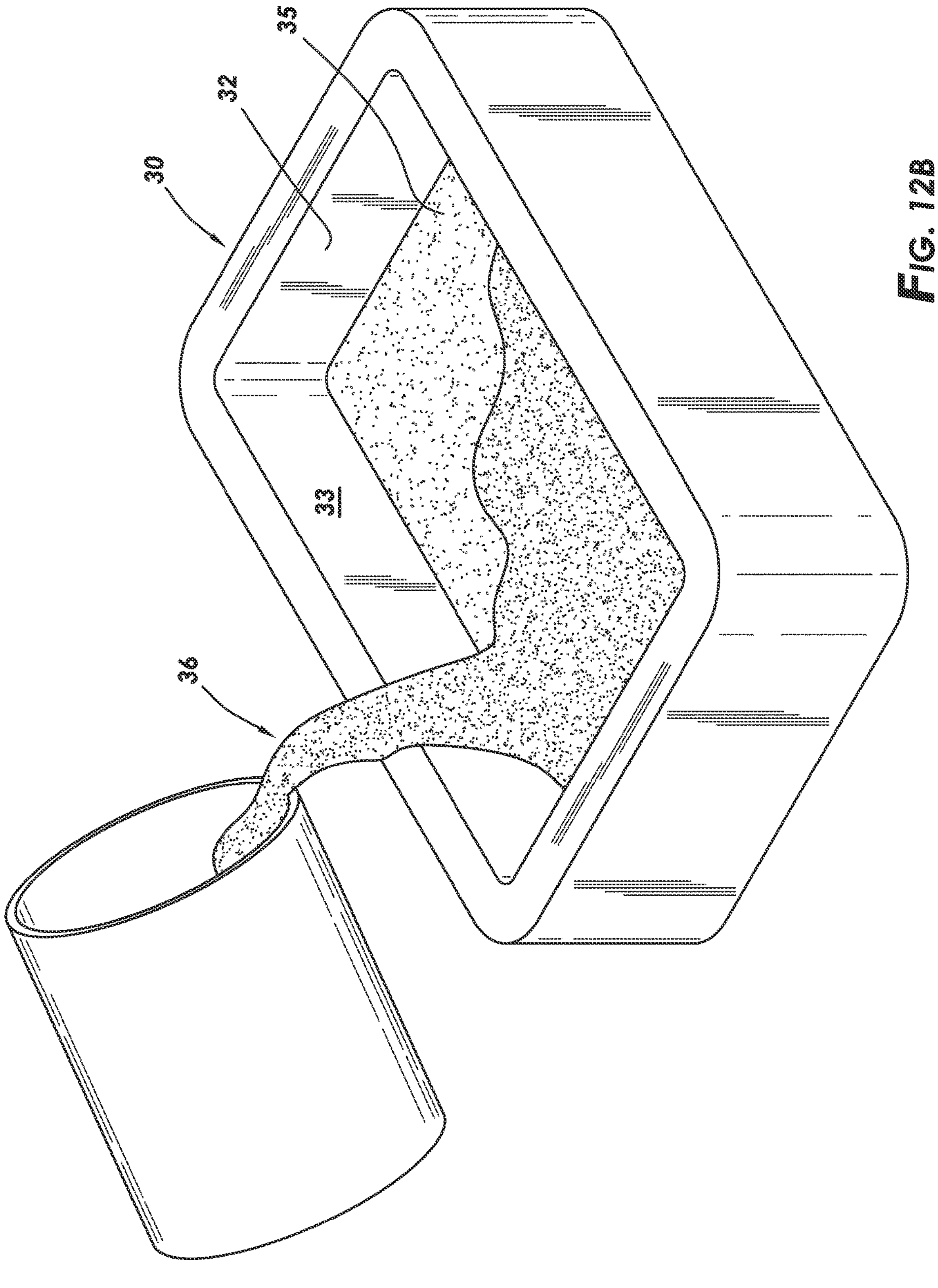
FIG. 12B is an illustration of the method shown in FIG. 12A, whereby a flowable second layer is being deposited into the mold interior space on top of the cured first layer.

Now referring primarily to FIG. 12B, the method can further include overlaying the cured first layer (35) with a flowable second layer (36), for example by depositing the flowable second layer (36) into the mold interior space (33) on top of the cured first layer (35).

Figure 12C:
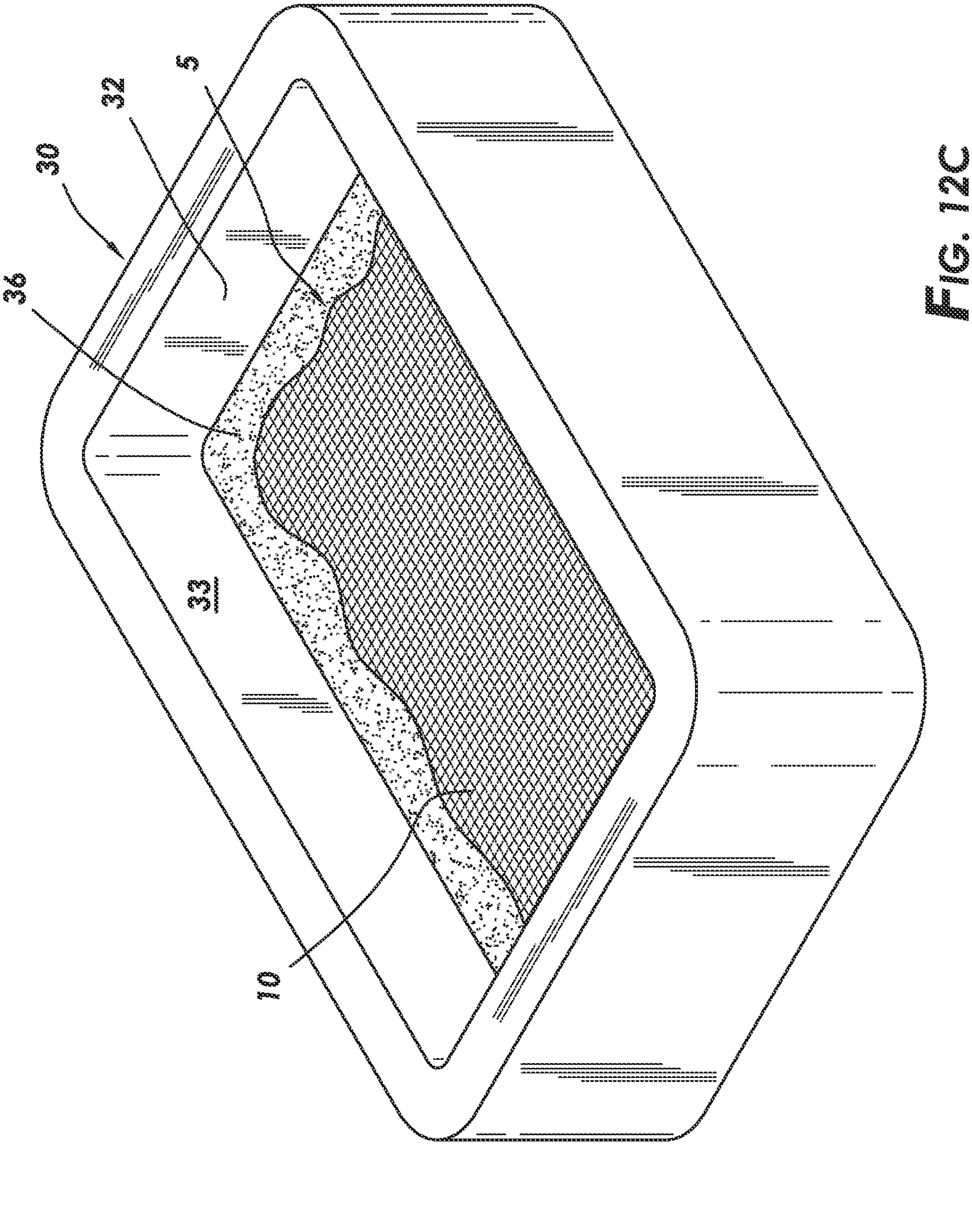
FIG. 12C is an illustration of the method shown in FIG. 12B, whereby a first fabric layer is being disposed on top of the flowable second layer.
Figure 12D:
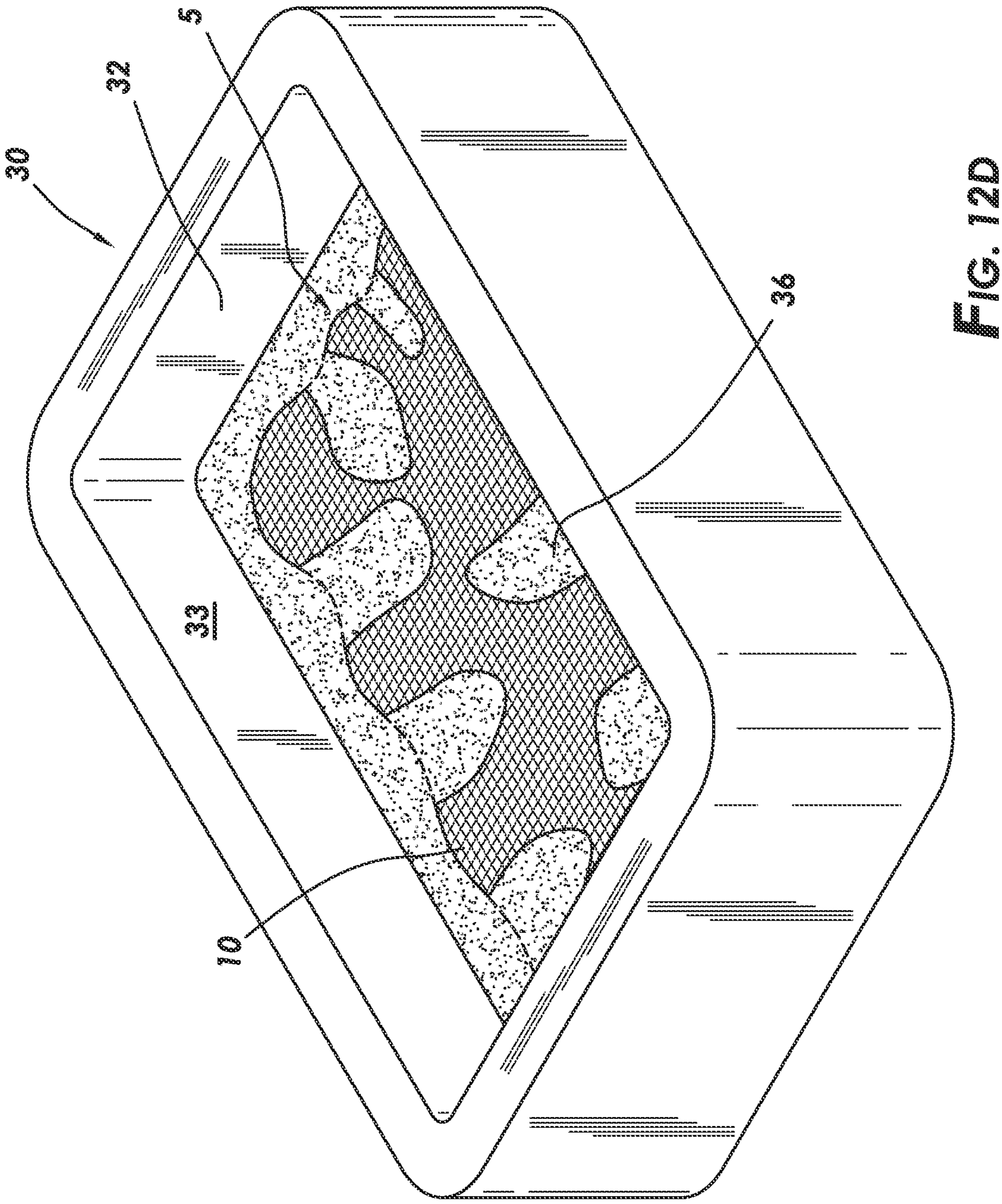
FIG. 12D is an illustration of the method shown in FIG. 12C, whereby the first fabric layer is sinking into the flowable second layer.

Following, the method can further include disposing the first fabric layer (5) within the second layer (4). Now referring primarily to FIG. 12C, as to particular embodiments, the method can include disposing the first fabric layer (5) on top of the flowable second layer (36), whereby following disposition, the first fabric layer (5) can move downwardly (or descend or sink) into the flowable second layer (36) (as shown in the example of FIG. 12D) to thereby embed itself in the second layer (4) as the second layer (4) cures. In this way, the first fabric layer (5) becomes suspended in the second layer (4), for example due to its buoyancy within the curing second layer (4). As to particular embodiments, the first fabric layer (5) may move downwardly into the flowable second layer (36) in an uneven fashion, thus resulting in a nonplanar and/or undulating and/or wavy disposition of the embedded first fabric layer (5) within the cured second layer (37).

Figure 12E:
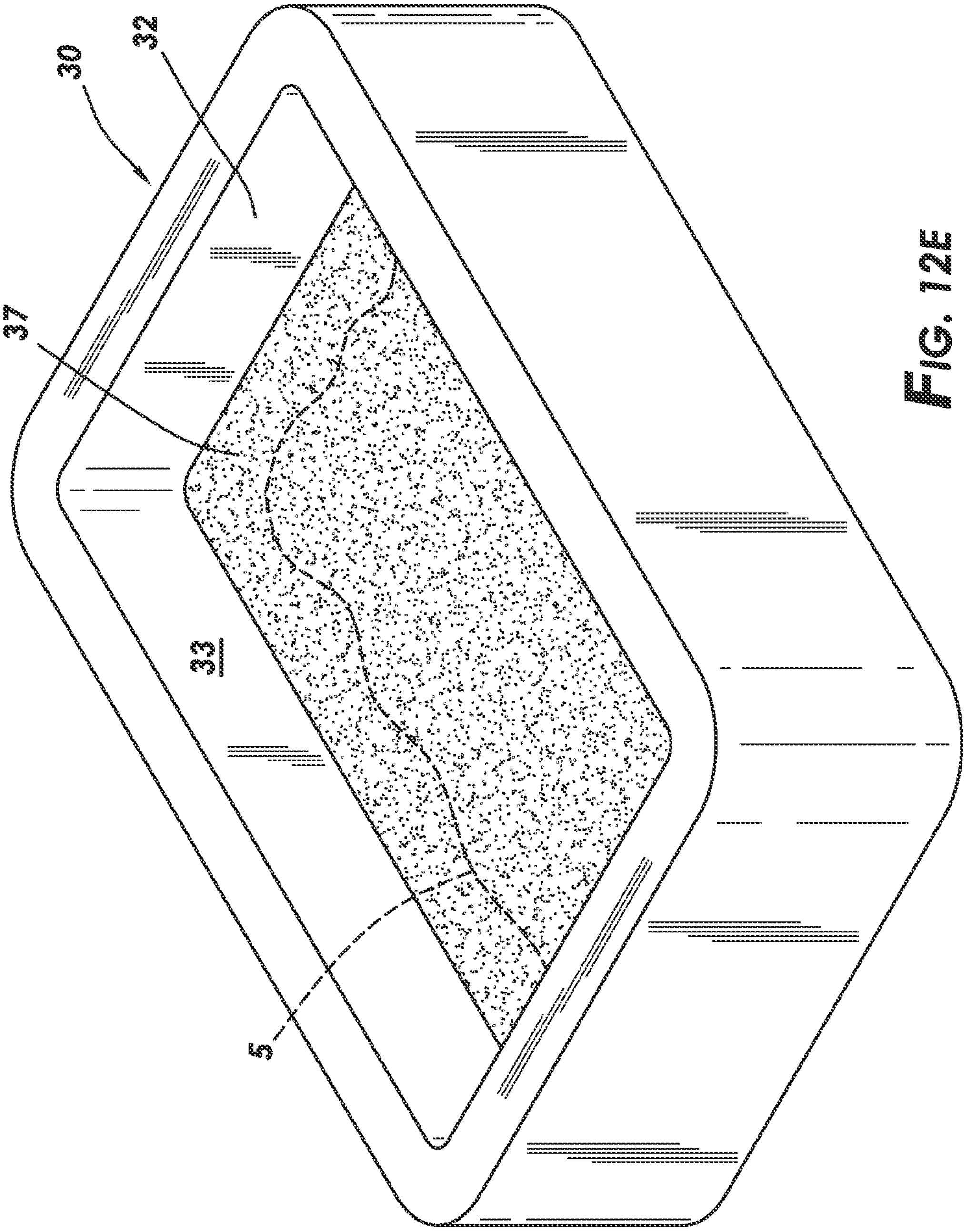
FIG. 12E is an illustration of the method shown in FIG. 12D, whereby the first fabric layer is embedded in the cured second layer between second layer upper and lower surfaces.

Now referring primarily to FIG. 12E, the flowable second layer (36) can cure to provide a cured second layer (37) in which the first fabric layer (5) is embedded between opposing second layer upper and lower surfaces (6)(7).

As to particular embodiments, the method can, but need not necessarily, further include generating additional layers of simulated body tissue, such as the third, fourth, fifth, and/or sixth layers (12)(18)(24)(27) described above, which can each be formed from the deposition of a corresponding layer within the mold interior space (33), whereby the adjacent layer has cured prior to deposition of a subsequent layer.

As to particular embodiments, the method can, but need not necessarily, further include disposing an additional fabric layer, such as the second and/or third fabric layers (15)(21) described above, on top of a flowable layer of simulated body tissue, whereby following disposition, the fabric layer can move downwardly (or descend or sink) into the flowable layer to thereby embed itself in the layer as the layer cures.

The method of making the instant simulated body tissue model (1) can further include providing additional components of the simulated body tissue model (1) as described above and in the claims.

As can be easily understood from the foregoing, the basic concepts of the present invention may be embodied in a variety of ways. The invention involves numerous and varied embodiments of a simulated body tissue model and methods for making and using such a simulated body tissue model.

As such, the particular embodiments or elements of the invention disclosed by the description or shown in the figures or tables accompanying this application are not intended to be limiting, but rather exemplary of the numerous and varied embodiments generically encompassed by the invention or equivalents encompassed with respect to any particular element thereof. In addition, the specific description of a single embodiment or element of the invention may not explicitly describe all embodiments or elements possible; many alternatives are implicitly disclosed by the description and figures.

It should be understood that each element of an apparatus or each step of a method may be described by an apparatus term or method term. Such terms can be substituted where desired to make explicit the implicitly broad coverage to which this invention is entitled. As but one example, it should be understood that all steps of a method may be disclosed as an action, a means for taking that action, or as an element which causes that action. Similarly, each element of an apparatus may be disclosed as the physical element or the action which that physical element facilitates. As but one example, the disclosure of a "layer" should be understood to encompass disclosure of the act of "layering"—whether explicitly discussed or not—and, conversely, were there effectively disclosure of the act of "layering", such a disclosure should be understood to encompass disclosure of a "layer" and even a "means for layering". Such alternative terms for each element or step are to be understood to be explicitly included in the description.

In addition, as to each term used it should be understood that unless its utilization in this application is inconsistent with such interpretation, common dictionary definitions should be understood to be included in the description for each term as contained in the Random House Webster's Unabridged Dictionary, second edition, each definition hereby incorporated by reference.

All numeric values herein are assumed to be modified by the term "about", whether or not explicitly indicated. For the purposes of the present invention, ranges may be expressed as from "about" one particular value to "about" another particular value. When such a range is expressed, another embodiment includes from the one particular value to the other particular value. The recitation of numerical ranges by endpoints includes all the numeric values subsumed within that range. A numerical range of one to five includes for example the numeric values 1, 1.5, 2, 2.75, 3, 3.80, 4, 5, and so forth. It will be further understood that the endpoints of each of the ranges are significant both in relation to the other endpoint, and independently of the other endpoint. When a value is expressed as an approximation by use of the antecedent "about," it will be understood that the particular value forms another embodiment. The term "about" generally refers to a range of numeric values that one of skill in the art would consider equivalent to the recited numeric value or having the same function or result. Similarly, the antecedent "substantially" means largely, but not wholly, the same form, manner or degree and the particular element will have a range of configurations as a person of ordinary skill in the art would consider as having the same function or result. When a particular element is expressed as an approximation by use of the antecedent "substantially," it will be understood that the particular element forms another embodiment.

Moreover, for the purposes of the present invention, the term "a" or "an" entity refers to one or more of that entity unless otherwise limited. As such, the terms "a" or "an", "one or more" and "at least one" can be used interchangeably herein.

Further, for the purposes of the present invention, the term "coupled" or derivatives thereof can mean indirectly coupled, coupled, directly coupled, connected, directly connected, or integrated with, depending upon the embodiment.

Thus, the applicant(s) should be understood to claim at least: i) each of the simulated body tissue models herein disclosed and described, ii) the related methods disclosed and described, iii) similar, equivalent, and even implicit variations of each of these devices and methods, iv) those alternative embodiments which accomplish each of the functions shown, disclosed, or described, v) those alternative designs and methods which accomplish each of the functions shown as are implicit to accomplish that which is disclosed and described, vi) each feature, component, and step shown as separate and independent inventions, vii) the applications enhanced by the various systems or components disclosed, viii) the resulting products produced by such systems or components, ix) methods and apparatuses substantially as described hereinbefore and with reference to any of the accompanying examples, x) the various combinations and permutations of each of the previous elements disclosed.

The background section of this patent application, if any, provides a statement of the field of endeavor to which the invention pertains. This section may also incorporate or contain paraphrasing of certain United States patents, patent applications, publications, or subject matter of the claimed invention useful in relating information, problems, or concerns about the state of technology to which the invention is drawn toward. It is not intended that any United States patent, patent application, publication, statement or other information cited or incorporated herein be interpreted, construed or deemed to be admitted as prior art with respect to the invention.

The claims set forth in this specification, if any, are hereby incorporated by reference as part of this description of the invention, and the applicant expressly reserves the right to use all of or a portion of such incorporated content of such claims as additional description to support any of or all of the claims or any element or component thereof, and the applicant further expressly reserves the right to move any portion of or all of the incorporated content of such claims or any element or component thereof from the description into the claims or vice-versa as necessary to define the matter for which protection is sought by this application or by any subsequent application or continuation, division, or continuation-in-part application thereof, or to obtain any benefit of, reduction in fees pursuant to, or to comply with the patent laws, rules, or regulations of any country or treaty, and such content incorporated by reference shall survive during the entire pendency of this application including any subsequent continuation, division, or continuation-in-part application thereof or any reissue or extension thereon.

Additionally, the claims set forth in this specification, if any, are further intended to describe the metes and bounds of a limited number of the preferred embodiments of the invention and are not to be construed as the broadest embodiment of the invention or a complete listing of embodiments of the invention that may be claimed. The applicant does not waive any right to develop further claims based upon the description set forth above as a part of any continuation, division, or continuation-in-part, or similar application.

The invention claimed is:

1. A simulated body tissue model comprising:

a first layer;

a second layer underlying said first layer; and a first fabric layer embedded within said second layer by disposing said first fabric layer on top of a flowable said second layer in a flowable condition;

wherein following disposition, said first fabric layer moves downwardly into said flowable second layer to thereby embed itself in said second layer as said second layer cures.

2. The simulated body tissue model of claim 1, said first fabric layer embedded within said second layer to provide an embedded first fabric layer.

3. The simulated body tissue model of claim 1, said first fabric layer suspended within said second layer to provide a suspended first fabric layer.

4. The simulated body tissue model of claim 2, wherein said embedded first fabric layer comprises chiffon.

5. The simulated body tissue model of claim 2, wherein said first layer mimics skin.

6. The simulated body tissue model of claim 5, wherein said first layer mimics an epidermis.

7. The simulated body tissue model of claim 6, wherein said second layer mimics a dermis.

8. The simulated body tissue model of claim 7, further comprising a third layer underlying said second layer.

9. The simulated body tissue model of claim 8, wherein said third layer mimics subcutaneous tissue.

10. The simulated body tissue model of claim 9, further comprising a fourth layer underlying said third layer.

11. The simulated body tissue model of claim 10, wherein said fourth layer mimics a first layer of fascia.

12. The simulated body tissue model of claim 11, further comprising a fifth layer underlying said fourth layer.

13. The simulated body tissue model of claim 12, wherein said fifth layer mimics muscle.

14. The simulated body tissue model of claim 13, further comprising a sixth layer underlying said fifth layer.

15. The simulated body tissue model of claim 14, wherein said sixth layer mimics a second layer of fascia.

16. The simulated body tissue model of claim 6, wherein said second layer mimics subcutaneous tissue.

17. The simulated body tissue model of claim 16, further comprising a third layer underlying said second layer.

18. The simulated body tissue model of claim 17, wherein said third layer mimics fascia.

* * * * *